United States Patent
Crinklaw et al.

(10) Patent No.: US 11,957,122 B2
(45) Date of Patent: Apr. 16, 2024

(54) ROBOTIC AGRICULTURAL SYSTEM AND METHOD

(71) Applicant: Crinklaw Farm Services, Inc., Kingsburg, CA (US)

(72) Inventors: David Curtis Crinklaw, Exeter, CA (US); Chase Schapansky, Fresno, CA (US); Richard Vaccari, Reedley, CA (US); Jeremy Bischel, Visalia, CA (US); Ryan Johnson, Kingsburg, CA (US)

(73) Assignee: GUSS Automation LLC, Kingsburg, CA (US)

( * ) Notice: Subject to any disclaimer, the term of this patent is extended or adjusted under 35 U.S.C. 154(b) by 345 days.

(21) Appl. No.: 17/412,180

(22) Filed: Aug. 25, 2021

(65) Prior Publication Data

US 2021/0378227 A1  Dec. 9, 2021

Related U.S. Application Data

(60) Continuation of application No. 16/203,531, filed on Nov. 28, 2018, now Pat. No. 11,140,889, which is a (Continued)

(51) Int. Cl.
*H04W 36/08* (2009.01)
*A01B 69/04* (2006.01)
(Continued)

(52) U.S. Cl.
CPC ......... *A01M 7/0014* (2013.01); *A01B 69/008* (2013.01); *A01B 79/00* (2013.01); (Continued)

(58) Field of Classification Search
None
See application file for complete search history.

(56) References Cited

U.S. PATENT DOCUMENTS

| 4,015,366 A | 4/1977 | Hall, III |
| 4,612,996 A | 9/1986 | Wolf et al. |

(Continued)

FOREIGN PATENT DOCUMENTS

| CN | 104476545 A | 4/2015 |
| CN | 104782326 A | 7/2016 |

(Continued)

OTHER PUBLICATIONS

Time Domain's Ultra Wideband (UWB) Definition and Advantages, 320-0294B, Jun. 2012, Huntsville, Alabama.
(Continued)

*Primary Examiner* — Frantz Bataille
(74) *Attorney, Agent, or Firm* — WHGC, P.L.C.; Alexander R. Schlee

(57) ABSTRACT

A robotic orchard spraying system having autonomous delivery vehicles (ADV), each autonomously delivering an amount of a premixed solution over a non-overlapping path verified by a forward-looking sensor, video, or both. Also, a mobile control center, configured to wirelessly inform the autonomous delivery vehicle of the path within the areas and to confirm that the autonomous delivery vehicle is following the path within the area. Additionally, a mapper vehicle generates the path within the area, the mapper vehicle being configured to communicate information about the path and the area to the command center. The mapper vehicle senses the path with a forward-looking LiDAR sensor, and senses the area with a GPS sensor. Moreover, a nurse truck has a reservoir of premixed solution for replenishing a tank of the ADV. ADVs and the control center communicate over a radio network, which may be a mesh network, a cellular network, or both.

9 Claims, 21 Drawing Sheets

Related U.S. Application Data division of application No. 15/250,279, filed on Aug. 29, 2016, now Pat. No. 10,149,468.

(51) Int. Cl.
*A01B 79/00* (2006.01)
*A01M 7/00* (2006.01)
*G05D 1/00* (2006.01)
*B05B 7/32* (2006.01)
*B05B 13/00* (2006.01)

(52) U.S. Cl.
CPC ......... *A01B 79/005* (2013.01); *A01M 7/0089* (2013.01); *G05D 1/0246* (2013.01); *G05D 1/0274* (2013.01); *G05D 1/0297* (2013.01); *B05B 7/32* (2013.01); *B05B 13/005* (2013.01); *G05D 1/024* (2013.01); *G05D 1/0278* (2013.01)

(56) References Cited

U.S. PATENT DOCUMENTS

| | | | |
|---|---|---|---|
| 5,079,706 A | 1/1992 | Yamaguchi et al. | |
| 5,442,552 A | 8/1995 | Slaughter et al. | |
| 5,606,850 A | 3/1997 | Nakamura | |
| 5,974,348 A | 10/1999 | Rocks | |
| 6,144,910 A | 11/2000 | Scarlett et al. | |
| 6,199,000 B1 | 3/2001 | Keller et al. | |
| 6,434,462 B1 | 8/2002 | Bevly et al. | |
| 6,445,983 B1 | 9/2002 | Dickson et al. | |
| 6,489,922 B1 | 12/2002 | Lin et al. | |
| 6,516,271 B2 | 2/2003 | Upadhyaya et al. | |
| 6,553,299 B1 | 4/2003 | Keller et al. | |
| 6,643,576 B1 | 11/2003 | O'Connor et al. | |
| 6,907,336 B2 | 6/2005 | Gray et al. | |
| 6,941,225 B2 | 9/2005 | Upadhyaya et al. | |
| 7,110,881 B2 | 9/2006 | Gray et al. | |
| 7,277,784 B2 | 10/2007 | Weiss | |
| 7,665,283 B2 | 2/2010 | Turner et al. | |
| 7,743,858 B2 | 6/2010 | Novoplanski et al. | |
| 7,765,780 B2 | 8/2010 | Koselka et al. | |
| 7,854,108 B2 | 12/2010 | Koselka et al. | |
| 8,019,503 B2 | 9/2011 | Jochem et al. | |
| 8,155,870 B2 | 4/2012 | Madsen et al. | |
| 8,180,514 B2 | 5/2012 | Kaprielian et al. | |
| 8,185,275 B2 | 5/2012 | Han et al. | |
| 8,190,337 B2 | 5/2012 | McClure et al. | |
| 8,381,501 B2 | 2/2013 | Koselka et al. | |
| 8,504,234 B2 | 8/2013 | Anderson | |
| 8,577,126 B2 | 11/2013 | Jones et al. | |
| 8,626,565 B2 | 1/2014 | Petroff | |
| 8,645,016 B2 | 2/2014 | Durkos et al. | |
| 8,725,361 B2 | 5/2014 | Kellum | |
| 8,768,558 B2 | 7/2014 | Reeve et al. | |
| 8,781,685 B2 | 7/2014 | McClure | |
| 8,855,405 B2 | 10/2014 | Mas et al. | |
| 8,886,382 B2 | 11/2014 | Nettleton et al. | |
| 9,117,185 B2 | 8/2015 | Vian et al. | |
| 9,144,188 B2 | 9/2015 | Trobat | |
| 9,146,553 B2 | 9/2015 | Nettleton et al. | |
| 9,201,421 B1 | 12/2015 | Fairfield et al. | |
| 9,232,687 B2 | 1/2016 | Bassett | |
| 9,265,187 B2 | 2/2016 | Cavender-Bares et al. | |
| 9,288,938 B2 | 3/2016 | Cavender-Bares et al. | |
| 9,308,939 B2 | 4/2016 | Osswald et al. | |
| 9,927,807 B1 | 3/2018 | Ganjoo | |
| 2003/0229424 A1 | 12/2003 | Miedema et al. | |
| 2007/0175198 A1 | 8/2007 | Viaud et al. | |
| 2007/0198144 A1 | 8/2007 | Norris et al. | |
| 2008/0046130 A1 | 2/2008 | Faivre et al. | |
| 2009/0319170 A1 | 12/2009 | Madsen et al. | |
| 2010/0106344 A1 | 4/2010 | Edwards et al. | |
| 2010/0305857 A1 | 12/2010 | Byrne et al. | |
| 2011/0103293 A1* | 5/2011 | Gale .................. H04W 88/10 370/315 | |
| 2011/0137456 A1 | 6/2011 | Koselka et al. | |
| 2012/0303202 A1 | 11/2012 | Durkos et al. | |
| 2013/0112441 A1 | 5/2013 | Trobat | |
| 2013/0325242 A1 | 12/2013 | Cavender-Bares et al. | |
| 2014/0081479 A1 | 3/2014 | Vian et al. | |
| 2014/0324336 A1 | 10/2014 | Prokhorov et al. | |
| 2014/0336818 A1 | 11/2014 | Posselius et al. | |
| 2015/0019081 A1 | 1/2015 | Katupitiya et al. | |
| 2015/0051779 A1 | 2/2015 | Camacho-Cook et al. | |
| 2015/0063202 A1 | 3/2015 | Mazzarella et al. | |
| 2015/0101519 A1 | 4/2015 | Blackwell et al. | |
| 2015/0105965 A1 | 4/2015 | Blackwell et al. | |
| 2015/0142250 A1 | 5/2015 | Cavender-Bares et al. | |
| 2015/0245565 A1 | 9/2015 | Pilgrim et al. | |
| 2015/0348419 A1 | 12/2015 | Matthews | |
| 2016/0082954 A1 | 3/2016 | Rennemann et al. | |
| 2016/0100517 A1 | 4/2016 | Bassett | |
| 2016/0100523 A1 | 4/2016 | Anderson | |
| 2016/0120124 A1 | 5/2016 | De Kleine et al. | |
| 2016/0124433 A1 | 5/2016 | Lavender-Bares | |
| 2016/0157414 A1* | 6/2016 | Ackerman .......... G05D 1/0225 701/25 | |
| 2017/0313421 A1 | 11/2017 | Gil | |
| 2018/0199207 A1 | 7/2018 | Zavesky et al. | |
| 2019/0036595 A1 | 1/2019 | Ohtsuji et al. | |

FOREIGN PATENT DOCUMENTS

| | | |
|---|---|---|
| JP | J015186473 A | 10/2015 |
| KR | 10-2016-0013713 | 2/2016 |
| WO | 2015119265 A1 | 8/2015 |
| WO | 2015134152 A1 | 9/2015 |
| WO | 2015156818 A1 | 10/2015 |
| WO | 2008153729 A1 | 12/2018 |

OTHER PUBLICATIONS

The Association for Unmanned Vehicle Systems International, Connecting the Unmanned Systems Community Across The Globe.
Y Huang, W.C. Hoffmann, Y. Lan, W.Wu, BK Fritz, Development of A Spray System for An Unmanned Aeria Vehicle Platform, 2009 American Society of Agricultural and Biological Engineers ISSN 0883-8542 vol. 25(6): 803-809.
Ji Zhang, Silvio Maeta, Marcel Bergerman, and Sanjiv Singh, Mapping Orchards for Autonomous Navigation, Written for Presenlaion 2014 ASABE and CSBE/SCGAB Annual Inl'l Meeting, Jul. 13-16, 2014, Paper No. 141838567.
Anthony Stentz, Cristian Dima, Carl Wellington, Herman Herman, David Stager, A System for Semi-Autonomous Tractor Operations, Robotics Institute of Carnegie Mellon University, Pittsburgh, PA.
Therobotrabbi, Farmer Bot Patrols the Orchard, Dec. 21, 2012, hllps://robolrabbi.com/2012/11/21/robot-armers/.
Kurashiki, K., Dept of Mechanical Eng., Kobe Univ., Fukao, T., Ishiyama, K., Kamiya, T., Orchard raveling UGV using particle fil er based localization and inverse optimal control, System Integration (SII), 2010 IEEE/SICE International Symposium, Dec. 21-22, 2010, pp. 31-36, Sendai, ISBN 978-1-4244-9316-6.
National Robotics Engineering Center website (http://www.nrec.ri.cmu.edu/projecls/auto_spraying).
Breit Davis, CMU-led automation program puts robots in the field, Mission Critical, Spring 2012, pp. 38-40.
The University of Sydney website, Robotics and Intelligent Systems: The Key to Future Grow1h in Farming, http://sydney.edu.au/engineering/research/robolics/agricultural.shlml.
Henry Lenard, Will Robots Make Farm Work a 2417 Business?, Mar. 1, 2013, http://www.robolicsbusinessreview.com/article/will_robots_make_farm_work_a_24_7_business/P2.
Orion Telecom Network Inc., 16xE1 75 Ohms (Ericsson-M4 Male Connector) Patch Panel with Additional Hi-Z Monitoring Port; Dec. 2009.
Perception and Interpretation of Dynamic Scenarios using Lidar Data and Images, Augustin Alberto Ortega Jimenez; institut de Robotica i Informatica Industrial (IRI), CSIC-UPC, Catalunya, Spain Jun. 2010.

(56) References Cited

OTHER PUBLICATIONS

35+ Robotics in Agriculture, IntoRobotics.com; Jul. 6, 2015; https://www.intorobotics.com/35-robots-in-agriculture/.
FAB-MAP 3D: Topological Mapping with Spatial and Visual Appearance; Rohan Paul and Paul Newman; 2010 IEEE Intenational Conference on Robotics and Automation; May 3-8, 2010, Anchorage, Alaska, USA.
Trimble GNSS Geodetic Antennas—A Solution For Every Application; Trimble Navigation Limited; 2012.
Are AG Robots Ready? 27 Companies Profiled; The Robot Report, Frank Tobe, Nov. 18, 2014; hllps://www.therobotreport.com/news/ag-in-transition-from-precision-ag-to-full-autonomy.
Precision Agriculture: Autonomous Robots for Large-Scale Agriculture; May 25, 2016; Http://recisionagriculture.re/autonomous-robots-for-large-scale-agriculture.
Autonomous Tractor—Next Generation Tractor is Here; Youtube; Kraig Schultz, Mar. 2, 2016; https://www.youtube.com/watch?v=X5VJUq_oQPE&feature=youtube.
ATC Your tractor. New technologgy. Totally autonomous., TC Demonstration of eDrive and AutoDrive, May 23, 2016, http://www.autonomoustractor.com.
Trimble BX982—Rugged Receiver Enclosure Housing a Dual Antenna Trimble BD982 OEM GNSS Module for Precise Position and Heading Applications; Datasheet; Trimble Navigation Limited.
ECU-2415 Machine Controller, Hydraforce.com; pp. 3.506.1-3.506.3; May 19, 2015.
Farming by the Numbers, IEEE Spectrum, Ariel Bleicher, May 30, 2013; http://spectrum.ieee.org/computing/it/farming-by-the-numbers.
From precision farming to autonomous farming: How commodity technologies enable revolutionary impact; Robohub.Jrg; Jeremy H. Brown; Nov. 11, 2013; http://robohub.org/from-precision-farming-to-autonomous-farming-how-commodity-technologies-enable revolutionary-impact.
Fully Autonomous Vehicles Are Coming. Are You Ready To Let Go?; Agriculture.com; Laurie Bedord; Apr. 19, 2016; http://www.agriculture.com/content/fully-autonomous-whicles-are-coming.
Antennas GPS-701-GGK & GPS-702-GGL; Novatel, Nov. 2015; www.novatel.com/products/gnss-antennas/high-performance-gnss-antennas/.
Sheffer Pneumatic & Hydraulic Cylinders, HH Series, heavy-duty hydraulic cylinders, pressure rating 3,000 PSI; The Sheffer Corporation; Oct. 5, 2013.
Kzvalve Catalog #26, Waterproof Electric Motorized Valves; kzvalve.com; Dec. 10, 2014.
Active, Optical Range Imaging Sensors, Paul J. Besl; Machine Vision and Applications; 1988; 1:127-152.
Road Environment Recognition Using On-Vehicle LiDAR; Kiyokazu Takagi, Katsuhiro Morikawa, Takashi Ogawa & Makato Saburi; IEEE—Intelligent Vehicles Symposium; Japan; Jun. 13-15, 2006.
Laser Measurement Systems of the LMS100 Product Family; SICK Sensor Intelligence; Germany; Jan. 26, 2010.
M8/M12 Connector System; TE Connectivity; May 21, 2104; te.com/products/m8-m12.
Controller Area Network (CAN) Overview; National Instruments; Aug. 1, 2014; www.ni .com.
Tree Species Recognition From T-Lidar for Forest Inventory; A. Othmani, A. Piboule and L.F.C. Lew Yan Voon; Office National des Forets; France; Apr. 13, 2016.
Rexroth Bosch Group, Product Catalog Mobile Hydraulics, Part 4: Mobile Electronics, Accumulators, Filters; Germany; Jul. 2012; www.boschrexroth.com/products, 20 pages.
Robotics and Autonomous Equipment; AG Professional; Rich Keller; Mar. 13, 2013; http://www.agprofessional.com/agprofessional-magazine/Roboti cs-and-Autonomous-Equipment-197152991.html.
A review of autonomous navigation systems in agricultural environments; N. Shalal, T. Low, C. McCarthy and N. Hancock; SEAg 2013 Innovative Technologies for a Sustainable Future; Sep. 22-25, 2013; Barton Western Australia.
Laser Measurement Systems of the LMS100 Product Family; SICK Sensor Technologies; Germany; Dec. 2009.
Application Report—Introduction to the Controller Area Network CAN); Steve Corrigan; Texas Instruments; Aug. 2002—Revised Jul. 2008.
Tree Measurement and Simultaneous Localization and Mapping System for Forest Harvesters; Matti Ohman, Mikko Miettinen, Kosti Kannas, Jaakko Jutila, Arto Visala, et al.; 6th International Conference on Field and Service Robotics—FSR 2007, Jul. 2007, Chamonix, France.
VLP-16 Velodyne LiDAR Puck User's Manual; Velodyne; http://velodyne. com/lidar/web/pdf/doc/Webserver%20Interface%201nstructions%20v1a.pdf.
Plant Species Classification using a 3D LiDAR Sensor and Machine Learning; U. Weiss, P. Biber, S. Laible, K. Bohlmann and A. Zell, Machine Learning and Applications (ICMLA), 2010 Ninth International Conference on, Washington, DC, 2010, pp. 339-345.

\* cited by examiner

ROBOTIC AGRICULTURAL SYSTEM AND METHOD

CROSS-REFERENCE TO RELATED APPLICATIONS

The present application is a continuation application of U.S. Ser. No. 16/203,531 filed Nov. 28, 2018. entitled "ROBOTIC AGRICULTURAL SYSTEM AND METHOD", which is divisional application of U.S. Ser. No. 15/250,279, filed 29 Aug. 2016, entitled "ROBOTIC AGRICULTURAL SYSTEM AND METHOD," both of which are hereby incorporated by reference herein in its entirety.

BACKGROUND

1. Field of the Invention

The present invention pertains to agricultural equipment, in general, and robotic agricultural spraying equipment, in particular.

2. Background Technology

Modern agricultural equipment can be hazardous and labor-intensive to operate. For example, current orchard spraying devices have exposed appendages and exposed moving parts that produce an aerosol of chemicals dangerous for human consumption. This is particularly the case when pesticides and fungicides are being sprayed on the orchard trees. Equipment operators are required to wear confining respirators and goggle to avoid incidental contact with the sprayed agent. Additionally, current orchard spraying devices can be clumsy and difficult to operate in an environment of a dense tree canopy, where the boughs of the trees hang low and the space between trees is thereby limited. Typical equipment contacts the low-hanging tree boughs and may cause injury to the trees. Also, the operator must be confined in a protective cab to prevent being jabbed and whipped by a low hanging tree canopy. Moreover, operation of modern agricultural equipment can be a slow and tedious affair. Operators must stop periodically to remove their protective gear, to get rested, hydrated and fed, in addition to rest stops. As a result, equipment operation progresses in fits and starts, continually limited by exhaustion and injury, governmental restrictions, and basic human needs. What is needed is an automated, robotic agricultural system that obviates the need for the human operators who are at risk by operating an existing equipment.

SUMMARY OF THE INVENTION

Embodiments provide a robotic agricultural system, having autonomous delivery vehicles, each configured to autonomously perform a respective predetermined agricultural task over respective predefined, non-overlapping paths within respective predefined non-overlapping areas. The respective predefined non-overlapping paths are verified by a respective autonomous delivery vehicle forward-looking sensor or a respective autonomous delivery vehicle video feed or both, and the respective predefined non-overlapping area being verified by a respective autonomous delivery vehicle geolocation sensor. Embodiments of the robotic agricultural system also include a control center, configured to wirelessly inform the autonomous delivery vehicles of the respective predefined non-overlapping paths and respective predefined non-overlapping areas, as well as provide operational commands. The control center may be a stationary control center or a mobile control center.

Additional embodiments include a mapper vehicle configured to identify predefined non-overlapping paths in respective predefined non-overlapping areas. The mapper vehicle is configured to communicate information about the respective predefined non-overlapping paths and the respective predefined non-overlapping areas to the control center. Embodiments of an autonomous delivery vehicle includes a vehicle chassis with a front and a rear, wherein the front vehicle chassis has an up-sloped front profile; hydraulic motors attached to the vehicle chassis, wherein the hydraulic motors motivate the autonomous delivery vehicle in a selected direction; a hydraulic pump attached to the vehicle chassis and fluidly coupled to drive the hydraulic motors; a motive engine mechanically coupled to, and configured to drive, the hydraulic pump, and attached to the vehicle chassis; an implement actuator, attached to the vehicle chassis rear, and coupled to the motive engine; and an implement, coupled to the implement actuator and configured to perform a predetermined agricultural task.

Embodiments of the autonomous delivery vehicle also include a respective vehicle control unit (VCU) coupled to a respective autonomous delivery vehicle (ADV) forward-looking LiDAR sensor and an ADV GPS sensor, the respective VCU generating a vehicle command based on the respective ADV forward-looking LiDAR sensor sensing the predefined non-overlapping path and a respective ADV GPS sensor sensing a predefined non-overlapping area containing the predefined non-overlapping path, the vehicle command including at least one of a steering command, a propulsion command, a throttle control command, a clutch command, a parking brake command, a predetermined agricultural task command, or a pressure control command, the respective autonomous delivery vehicle responding to at least one vehicle command. In other embodiments, the respective vehicle control unit receives at least one sensed input from at least one of a steering sensor, a speed sensor, a clutch pressure sensor, and an implement actuator sensor. The vehicle command includes at least one of a steering command, a propulsion command, a throttle control command, a clutch command, a parking brake command, a predetermined agricultural task command, or a pressure control command, the vehicle control unit issuing a vehicle command responsive to the at least one sensed input and the respective autonomous delivery vehicle responding to the vehicle command. Other embodiments of the respective autonomous delivery vehicles include a vehicle chassis with a front and a rear, wherein the front vehicle chassis has an up-sloped front profile; a motive engine attached to the vehicle chassis; a hydraulic system, having hydraulic motors attached to the vehicle chassis, wherein the hydraulic motors motivate the autonomous delivery vehicle in a selected forward-backward direction, a hydraulic steering apparatus that motivates the autonomous delivery vehicle in a selected right-left direction, and a hydraulic pump attached to the vehicle chassis, fluidly coupled to drive the hydraulic motors and the hydraulic steering apparatus, and mechanically coupled to the motive engine, and a dispersal fan, attached to the vehicle chassis rear, and coupled to the motive engine. The respective vehicle also includes an implement actuator attached to the chassis, and coupled to the motive engine, and an implement coupled to the implement actuator, and configured to perform a predetermined agricultural task.

Embodiments of the autonomous delivery vehicle can include a collision avoidance system including command and control software that causes respective predefined paths to not overlap and respective predefined areas to not overlap. Embodiments of the autonomous delivery vehicle also can include a collision mitigation system including command and control system software that causes two adjacent autonomous delivery vehicles to turn in proximity to each other without a collision. Embodiments of the respective autonomous delivery vehicle also can include a remote control, independent of the respective autonomous delivery vehicle (ADV) chassis, the remote control wirelessly and selectably coupleable to the respective ADV, the remote control being configured to over-ride autonomous action and operate at least one of a steering function, a propulsion function, a clutch function, a pressure function, a predetermined agricultural task function, or an E-Stop function.

Embodiments of the robotic agricultural system can include a mobile control center, configured to wirelessly inform the respective autonomous delivery vehicles of the respective predefined non-overlapping paths within the respective predefined non-overlapping areas and to confirm that the autonomous delivery vehicles are following the respective predefined non-overlapping path within the respective predefined non-overlapping area; a mapper vehicle, the mapper vehicle generating the respective predefined non-overlapping paths within the respective predefined non-overlapping areas; and the mapper vehicle configured to communicate information about the respective predefined non-overlapping paths and the predefined non-overlapping areas to the mobile control center, wherein the mapper vehicle senses the respective predefined non-overlapping paths with a mapper vehicle forward-looking LiDAR sensor, and senses the respective predefined non-overlapping areas with a mapper vehicle GPS sensor; and a nurse truck having a reservoir of premixed solution for replenishing the respective premixed solution tanks of the respective autonomous delivery vehicles.

Embodiments also provide a command and control network for an agricultural robotic system, having a radio network coupling at least one autonomous delivery vehicle to a control center; and a video network coupling at least one autonomous delivery vehicle to the control center. The radio network is an Internet protocol network and the video network is an Internet protocol network. In some embodiments of the command and control network, the radio network is a mesh network integrating the video network and transmitting a video feed of the video network and radio signals to the control center. In other embodiments of the command and control network, the radio network is a mesh network separate from the video network. In yet other embodiments of the command and control network, the radio network is a cellular network.

Embodiments provide a method for a robotic agricultural system, including autonomously determining a non-overlapping forward path; autonomously following the non-overlapping forward path; and while following the non-overlapping forward path, autonomously performing a predetermined agricultural task on the non-overlapping forward path. Further, embodiments can include downloading to the autonomous delivery vehicle a predetermined non-overlapping forward path; comparing a current forward path to the downloaded pre-identified non-overlapping forward path; and autonomously correcting a heading corresponding to a downloaded non-overlapping forward path, using a forward-looking sensor on the autonomous delivery vehicle.

BRIEF DESCRIPTION OF THE DRAWINGS

Embodiment of the present invention disclosed herein are illustrated by way of example, and are not limited by the accompanying figures, in which like references indicate similar elements, and in which.

FIG. 9 is a block diagram of a ADV control bus structure, according to the teachings of the present invention;

FIG. 10 is an illustration of an external view of a mobile control center of FIG. 1, according to the teachings of the present invention;

FIG. 11 is an illustration of an internal view of the mobile control center, according to the teachings of the present invention;

FIG. 12 is a block diagram of a communications and positioning system for the mobile control center, according to the teachings of the present invention;

FIG. 13 is an illustration of a mapper vehicle of FIG. 1, according to the teachings of the present invention;

FIG. 14 is an illustration of a mapper vehicle positioning system, according to the teachings of the present invention;

FIG. 15 is an illustration of a nurse truck of FIG. 1, according to the teachings of the present invention;

FIG. 16 is a block diagram of a nurse truck radio repeater, according to the teachings of the present invention;

FIG. 17 is a block diagram of an automated mixing system of the nurse truck, according to the teachings of the present invention;

FIG. 18 is an illustration of the system in FIG. 1, deployed in an orchard, according to the teachings of the present invention;

FIG. 19A is an illustration of an ADV right broadside profile, according to the teachings of the present invention;

FIG. 19B is an illustration of an ADV left broadside profile, according to the teachings of the present invention;

FIG. 19C is an illustration of an ADV front, head-on profile, according to the teachings of the present invention;

FIG. 19D is an illustration of an ADV back, rear-on profile, according to the teachings of the present invention;

FIG. 19E is an illustration of an ADV left, front perspective profile, according to the teachings of the present invention; and FIG. 19F is an illustration of an ADV right, rear perspective profile, according to the teachings of the present invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated.

DETAILED DESCRIPTION OF EMBODIMENTS

Embodiments herein are described within the non-limiting context of a tree orchard, although other embodiments including, without limitation, a viticulture context or a crop context, are possible, mutatis mutandi. Crops can be perennial or annual, or both. In addition, although agricultural spraying is explained in detail, all other agricultural purposes are possible, particularly those implementations suitable for mechanical or hydraulic actuation, including fertilizing, disking, plowing, tilling, or spreading. In general, an autonomous robotic sprayer is a type of autonomous delivery vehicle that is configured to autonomously perform a respective predetermined agricultural task. A fleet of autonomous delivery vehicles can be used to perform one or more respective predetermined agricultural tasks at a time in an orchard, a vineyard, or a field of crops, including perennial crops.

Continuing with the spraying example, an autonomous delivery vehicle-sprayer can allow a single user to control multiple like autonomous delivery vehicle-sprayers, as the vehicles work in an orchard, a vineyard, or a crop with substantial efficiency. The control of one or multiple sprayers, or of one or more autonomous delivery vehicles, can be effected within the context of an autonomous agricultural system, and through a network of cooperative vehicles, a communications network, which coordinates the vehicles. The autonomous delivery vehicles follow software-controlled maps and paths within the maps, to perform predetermined agricultural tasks directed to efficiently farming, without limitation, perennial crops. Certain embodiments of devices, components, and methods herein may be configured to operate within one or more parts of international standard ISO 25119 —*Tractors and machinery for agriculture and forestry—Safety-related parts of control systems*. (Reference ISO 25119:2010(E)). Furthermore, embodiments herein may be compatible with draft standard ISO/DIS 18497— *Agricultural machinery and tractors—Safety of highly automated machinery*. (Reference ISO/DIS 18497:2015). The foregoing documents are incorporated by reference herein in their respective entireties.

Figure 1:
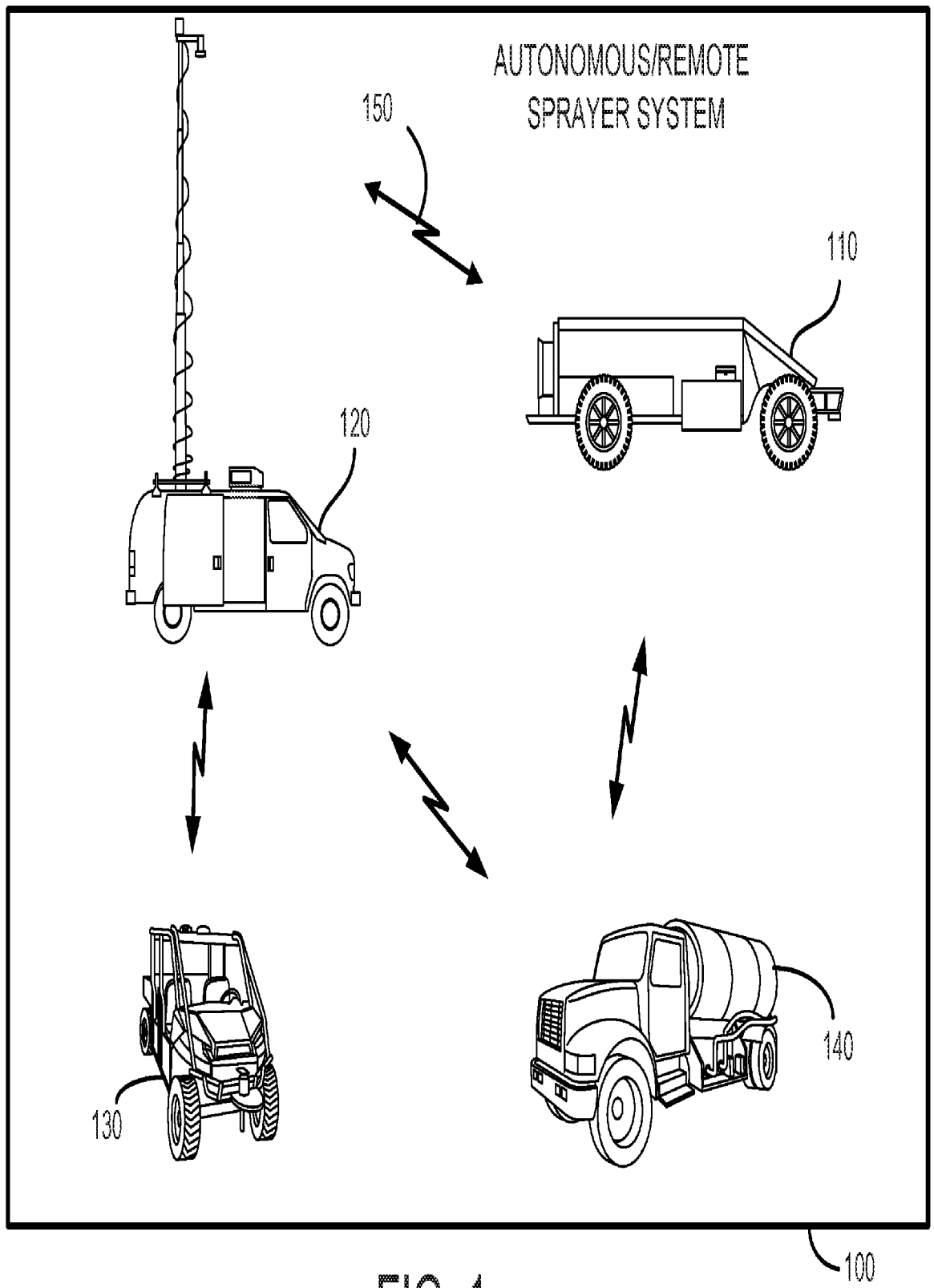
FIG. 1 is an illustration of an example robotic agricultural spraying system, according to the teachings of the present invention.

In FIG. 1, the overall autonomous agriculture system 100 is illustrated. System 100 includes autonomous delivery vehicle (ADV) 110, mobile control center 120, mapper vehicle 130, and nurse truck 140. Nurse truck 140 is provided in support of spraying operations, but is not required. ADV 110 can be an autonomous part of system 100, which, as a non-limiting example, applies chemicals, such as fertilizer, pesticides, and fungicides, to agricultural crops, such as in orchards, in vineyards, or in row crops. ADV 110 uses precision electronic equipment to control rate and pressure of applied chemicals, and ADV 110 speed, direction, and location. ADV 110 is capable of operating in an autonomous mode, or in a remote mode. In an autonomous mode, system 100 can have one or more ADVs 110 being overseen and controlled by mobile control center 120, and providing services to at least one respective predetermined parcel of land, for example, an orchard, a vineyard, or a row crop, or a portion of an orchard, a vineyard, or a row crop. ADV 110 is configured to communicate with mobile control center 120 in both autonomous and remote modes. In an autonomous mode, ADV 110 operates without direct input by a human user; in remote mode, ADV 110 operates remote from a manually-operated control pad (not shown—see FIG. 4). ADV 110 can be equipped with high-precision global navigation satellite system (GNSS) equipment, such as RTK-DGPS. ADV 110 can include forward-looking sensor, such as LiDAR, for identifying the presence of, and the adherence to, a forward path, and for identifying obstacles in the forward path. Forward-looking LiDAR is helpful, for example, for finding tree trunks and determining a central path through the tree trunks.

GNSS equipment on ADV 110 can include fore and aft GPS equipped to work with multi-constellation, real-time kinematic (RTK) networks, giving horizontal and vertical positioning with centimeter precision. GPS can be augmented with an inertial navigation unit. ADV 110 also can be equipped with fore and aft hi-definition video cameras to provide real-time visualization of the field of operation. All data received and sent by ADV 110 to mobile control center 120 can be by packet radio transmitted at 900 MHz, 2.4 GHz, or 5.8 GHz, depending upon weather conditions, vegetation canopy density, and other conditions. One of ordinary skill in the art would realize that other radio frequencies could be used. In a remote mode, ADV 110 may be operated to provide services by a remote-control pad having toggle switches and a joystick, instead of using mobile control center 120. ADV 110 can sound an audible alarm prior to moving.

Mobile control center 120 can be a communications van with a 60-foot telescopic pneumatic mast antenna, similar to familiar news vans. Mobile control center 120 can contain several computers, multiple display screens, and command and control software. An operator can be housed in mobile control center 120 to oversee an entire operation, which may include multiple ADVs 110 spread out over a large area. Mobile control center 120 informs an ADV 110 of the predefined path that it is to take in a predefined area. Mobile control center 120 can have an on-board electric generator, and an air compressor installed on its chassis with a number of electrical outlets positioned inside and outside of the mobile control center 120. Air conditioning and heating also may be provided. On the distal end of the mast are connections, mountings, cameras and antennas to support audio and video feeds as well as wireless data feed.

In addition, it has been found that mapped plots of the predetermined parcel of land can be beneficial. Previously unmapped orchard areas can be identified with a map created for use during spraying. Accordingly, in certain embodiments, mapper vehicle 130 can identify plot configurations with fore and aft GPS equipped to work with multi-constellation, real-time kinematic (RTK) networks, similar to ADV 110. GPS data can be used to identify a pre-defined area. Moreover, mapper vehicle 130 can use forward-looking LiDAR to identify, for example, tree trunk positions, a path between the tree trunks, and any potential obstacles within the area to be mapped. Forward-looking LiDAR data may be used to identify a predefined path, although other forward-looking sensors may be used to identify the predefined path, including, without limitation, infrared, RADAR, and video imaging systems. Typically, mapper vehicle 130 drives a path through the orchard, which is substantially similar to the path to be taken by ADV 110 during operation, and continues to map until a predefined area, for example, an entire orchard or part of an orchard, is mapped. A "map" may include GPS and LiDAR data of the predefined paths and predefined areas. Mapper vehicle 130 can collect GPS and LiDAR information, and can transmit that information by radio, in the 900 MHz, 2.4 GHz, or 5.8

GHz radio bands, back to mobile control center 120 for storage and later use by ADV 110.

In some embodiments, nurse truck 140 can be positioned in a designated area (apron) of sufficient size on the predetermined parcel of land, such that it is convenient to replenish ADV 110 with fuel, hydraulic fluid, or premixed solution for spraying. Typically, nurse truck 140 can carry about 2400 gallons, although other tank sizes can be used. Nurse truck 140 also can be outfitted with a radio repeater, to assist with sending control signals to, and monitoring sensed signals from, ADV 110 in the field. The radio repeater also operates on one of 900 MHz, 2.4 GHz, or 5.4 GHz, although other frequencies may be used. Typically, nurse truck 140 is positioned in a portion of the nurse area, which is a portion of land proximate to an aisle in the orchard in which spraying occurs. This portion of land will change as ADV 110 moves throughout the orchard, vineyard, or open field. Nurse truck 140 can refill ADV 110 when additional spraying solutions are needed. In selected embodiments, nurse truck 140 also can replenish hydraulic fluid or fuel. A nurse area can be a region where ADV 110 is transitioned from remote to autonomous mode, and back, or, for example, in an area in between rows of trees. ADV 110, mobile control center 120, mapper vehicle 130, and nurse truck 140 can be representative of similar devices throughout the description, unless the particular description illustrates a particular embodiment of the device.

Figure 2:
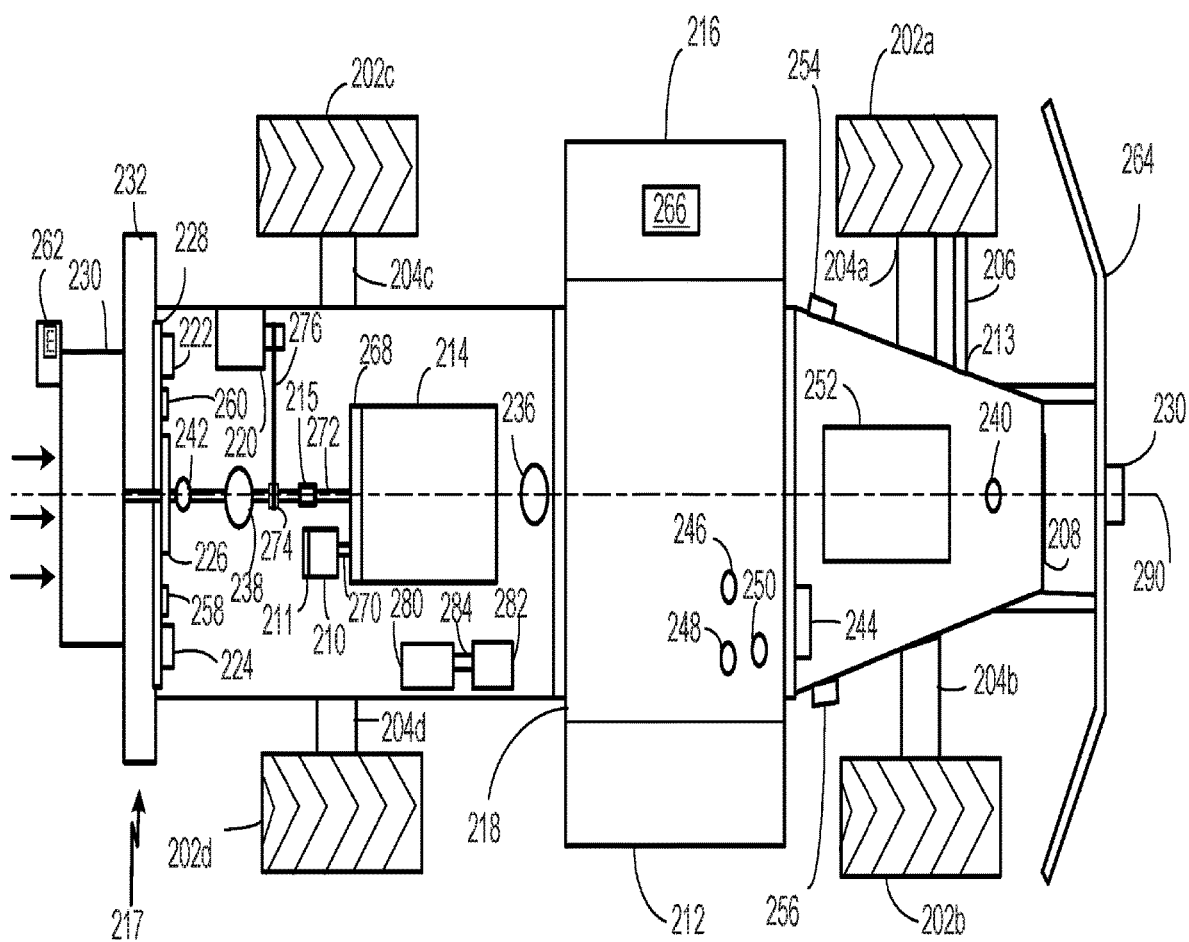
FIG. 2 is a top plan overview of an autonomous delivery system (ADV) of the system in FIG. 1, according to the teachings of the present invention.

Turning to FIG. 2, a top plan view of ADV 200, in accordance with present embodiments is shown. ADV 200 can be an embodiment such as ADV 110 in FIG. 1. ADV 200 will be described in general terms in FIG. 2 and described with particularity with respect to later FIGURES. ADV 200 can be configured as an agricultural sprayer vehicle, although other configurations are possible. In particular, an embodiment of ADV 200 can be configured to be an autonomous orchard spraying vehicle. Another embodiment of ADV 200 can be configured as an autonomous vineyard spraying vehicle. Accordingly, ADV 200 is driven on four heavy-duty tires 202*a-d*, which are motivated by four respective hydraulic motors 204*a-d*. Tires 202*a-d* can be model IN445/50D710 (44 in. dia.×18 in. wide) by OTR of Rome, GA, USA. Hydraulic motors 104*a-d* can be Model R092505296 by Bosch Rexroth of Charlotte, NC, USA. Forward tires 202*a,b* are turned by hydraulic steering mechanism 206, which when actuated guides forward tires 202*a,b* to the right and to the left, relative to the longitudinal centerline 290 of ADV 200. Hydraulic steering mechanism 206 can be single-ended Model 2-1/2HHC10K provided by Sheffer of Blue Ash, OH, USA. Steering angle (turning degree left/right) can be detected by a magneto-resistive linear positioning measuring sensor 213, such as the 100-degree steering angle sensor model SPS-A100D-HAWS from Honeywell, Morristown, NJ Sensor 213 detects the degree of angular displacement of the wheel axle mechanism, which can be calibrated to up to plus or minus 50 degrees off of centerline 290. Sensor 213 can be chassis-mounted, with a separate magnet being disposed in proximity on the wheel axle mechanism of ADV 200. Of course, other steering angle position detectors may be used.

Power for hydraulic motors 204*a-d* can be provided by hydraulic pump 210, which is fed from hydraulic fluid tank 212. Power for hydraulic steering mechanism 206 can be provided by hydraulic accessory pump 211, which also is fed from tank 212. In turn, power for hydraulic pumps 210, 211 may be provided by motive engine 214. Engine 214 can be a diesel engine, with 6.7 Liter displacement, with 173 HP, such as by Cummins, Inc. Columbus, IN, USA. For starting power, engine 214 can be coupled to main battery 280, for example, a Powerstride model PS31-950, having a rating of 12 V, and 950 Cold cranking amps, from Powerstride, Corona, CA USA. In addition, the electronic components of ADV 200 can be powered by auxiliary battery 282, e.g., a Powerstride 44RC, rated at 12 V, 32 Amp hours. Battery isolator 284 can be coupled between the main battery and the auxiliary battery. Battery isolator 284 does not allow the engine starter to draw power from auxiliary battery. During cranking, the voltage can drop too low for some of the electrical components, causing them to shut down. Isolator 284 allows the voltage to remain at the correct voltage for the electronics. A suitable battery isolator can come from Cole Hersee®, Littelfuse Commercial Vehicle Products, Schertz TX USA. When the voltage drops in autonomous mode, the vehicle will not start because the vehicle control unit (VCU) needs to see all the components online and reporting back to the VCU. If this does not happen the vehicle will enter an e-stop state.

Engine 214 can be engaged with ADV 200 drive train (not shown). Hydraulic clutch 215 selectively engages/disengages solution pump 220 and dispersal fan 230 to engine 214. Engine 214 provides driver power to hydraulic pumps 210, 211. Hydraulic pump 210 powers hydraulic motors 204*a-d* used to turn the wheels 202*a-d* of ADV 200. Hydraulic pump 210 can be Model AA4UG56EP3DTi/32LNSC52F04FP by Bosch Rexroth of Charlotte, NC, USA. Hydraulic accessory pump 211 can be used to power the hydraulic steering 206 of ADV 200, and can be a model P2100C486GDZA07-87 from Bosch Rexroth from Charlotte, NC USA. Motive engine 214 can be coupled to a gearbox 268 having two output shafts 270, 272. First output 270 shaft can drive the hydraulic pumps 210, 211. Second output shaft 272 can be coupled to hydraulic clutch 215, which can be coupled to dispersal fan 230. Disposed on the second output shaft 272 can be pulley 274 which can be coupled to solution pump 220 by way of a belt 276. Thus, when the hydraulic clutch 215 is engaged, second output shaft 272 causes dispersal fan 230 to turn, and solution pump 220 to run. Hydraulic fluid tank 212 can serve as a reservoir for hydraulic pumps 210, 211, and can have a capacity of about 80 gallons.

Aqueous aerosolizer subsystem 217 can include solution reservoir 218, which is coupled to solution pump 220 which, in turn, supplies right spray valve 222 and left spray valve 224. Flowmeter 226 senses the flow distributed by spray nozzles 228. Dispersal fan 230 is coupled to delivery duct 232. Spray nozzles 228 are positioned to deliver solution to delivery duct 232. In present embodiments, reservoir 218 can be a 600 gallon stainless steel tank, holding pre-mixed solution, and solution pump 220 can draw input from reservoir 218, and provide output to spray valves 222, 224. Right spray valve 222 delivers the pre-mixed solution from pump 220 to the right side of delivery duct 232 of ADV 200 (relative to centerline 290), and left spray valve 224 delivers the pre-mixed solution from pump 220 to the left side of delivery duct 232 of ADV 200.

Flowmeter 226 senses output from spray valves 222, 224 to ensure that the proper volume of solution is being delivered to delivery duct 232. Dispersal fan 230 draws air in from the rear of ADV 200, and forces air and aerosolized premixed solution out through delivery duct 232. The predetermined volume of air being drawn in combines with the predetermined volume of solution being delivered to nozzles 228, and provides a highly accurate aerosolized delivery of the premixed solution. Solution pump 220 can be a 2-stage centrifugal pump Model 12CI-2022C95 from Myers of Delevan WI, USA. Solution pump 220 can be belt driven from a pulley on the shaft of dispersal fan 230. Thus, when hydraulic clutch 215 is engaged, both solution pump 220 and dispersal fan 230, are actuated. Spray valves 222, 224 can be Model 92FM33-10D20-P01, 1-inch Stainless Steel 3-Piece 2-Way ON/OFF Full Port Ball Valve w/Handle with a 0.8 sec cycle, manufactured by KZ of Ashland, NE, USA. The output of spray valves 222, 224 can be monitored by flowmeter 226, which can be a model ARAG ORION (P/N 4622AA51616) from Hypro/Pentair, Inc., New Brighton, MN USA.

Dispersal fan 230 can be a "sucking fan" Model LFC 400/16T CR1013606 E4-36 in. glass fiber-reinforced, polypropylene-bladed, and shaft-driven fan from Breeza Industrial, Utica, NE USA. Dispersal fan 230 may be actuated/deactuated by respectively engaging/disengaging hydraulic clutch 215. Dispersal fan 230 draws air in the forward direction of travel at the rear of ADV 200, and aerosolizes and disperses the pre-mixed solution by way of forcing a predetermined volume of air into the spray nozzles outlet delivery duct 232. This technique ensures that trees are contacted by the premixed solution in proper proportion from the tree trunk to the tree canopy. Having individualized left and right spray valves ensures that spray is directed only to actual row(s) of trees, or to areas designated to be sprayed, for example, on one side of ADV 200.

ADV 200 can have a guidance and control subsystem, which may include a GPS-based GNSS system having a fore GPS antenna 236 and an aft GPS antenna 238. GPS signals provide ADV 200 with its horizontal and vertical position, both in absolute GIS coordinates and relative to a pre-established set of land coordinates. Communication of GPS coordinates and ADV 200 system parameters can be relayed to a control station by radio 244, using antennas 246, 248, and 250, which may be facilitate communication at 900 MHz, 2.4 GHz, and 5.8 GHz, respectively. Moreover, fore camera 240 and aft camera 242 can provide surveillance and positioning video feeds, which feeds also may be communicated via radio 244. Forward path verification and path obstruction detection can be accomplished by forward-looking planar laser 230, which assists with autonomous operation. Indeed, when an object comes within a predetermined distance from the front of the vehicle, forward-looking planar laser 230 can send an alert to the ADV control system. ADV 200 stops to avoid collision with the object. Electrical box 252 contains the electrical, control, and communication elements of ADV 200, which elements will be described below. Safety features include a parking brake (not shown), which is engaged any time there is no forward or reverse command issued, a manual ADV shutoff ("E-Stop") button, and visual indicator lights for a parking brake and for a full pre-mixed solution indicator, are housed on block 262. The E-Stop button, when actuated, causes engine 214 to shut down, and sets the parking brake. Another safety feature can be forward bumper 264 which, when contacted, also causes engine 214 to shut down and sets the parking brake. One way by which an operator can transition between autonomous and remote operation (and back) is to toggle autonomous/remote switch 266 located on the ADV 200 chassis.

Illumination of the forward path of ADV 200 can be provided by horizontal strips of white LED lamps, forming headlight 208. Such a headlight can be model ORBX21-54WS-SP by Super Bright LEDs, St. Louis, MO USA. Lights 254, 256, 258, 260, which may be blinking, indicate whether ADV 200 is in autonomous mode (AMBER/BLUE), in remote mode (AMBER), in suspend mode (AMBER/BLUE/RED), or in an error mode (RED). Other lighting color schemes are possible. Flashing lights 254, 256, 258, 260 each can be model STRB-x4 W by Super Bright LEDs, St. Louis, MO USA. Lighting color schemes may change to coincide with an applicable standard, e.g. Draft ISO Std. 18497. It is to be understood that all agricultural embodiments are contemplated and may be implemented in ADV 200. Such uses can include, for example, and without limitation, agricultural disking or spreading, in which aqueous aerosolizer subsystem 217 and dispersal fan 230 are replaced with a suitable implementation that is subject to hydraulic or mechanical actuation.

Figure 3:
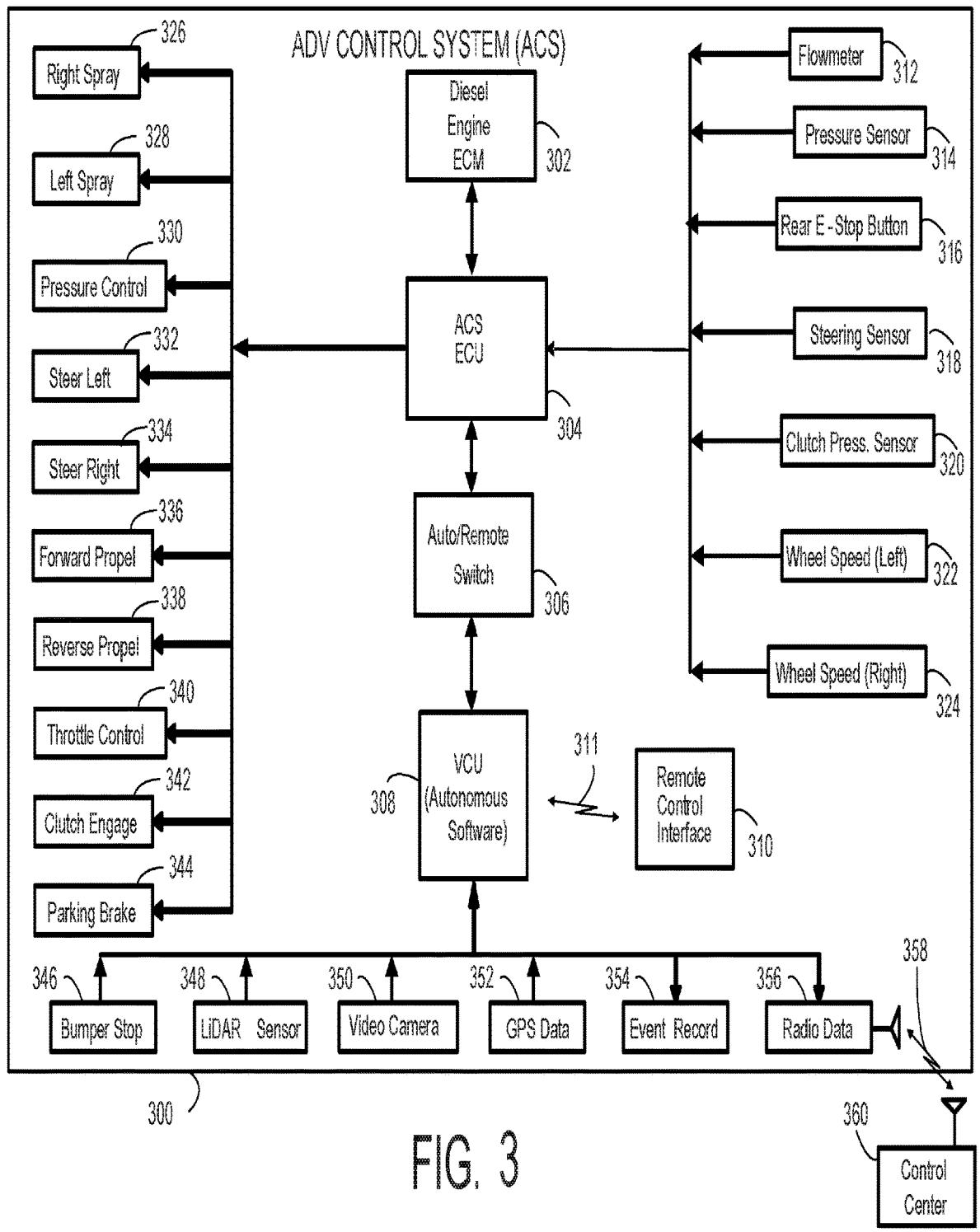
FIG. 3 is a block diagram of a control system for an ADV, according to the teachings of the present invention.

Turning to FIG. 3, autonomous delivery vehicle control system (ACS) 300 will be described. FIG. 3 is described within the context of FIG. 2. In general, system 300 can be operated in an autonomous mode or in a remote mode. When Auto/Remote switch 306 is in the remote mode, a user can control the ADV 110 by means of a Remote Control Interface 310. When Auto/Remote switch 306 is in the autonomous mode, ADV 110 can be in the Autonomous mode, by which ADV 110 autonomously controls positioning, propulsion, spray parameters (arrangement, pressure, and flow), and engine throttle control.

Engine ECM (Electronic Control Module) 302 automatically cranks, starts, and monitors engine 214, for combustion, emissions control, engine speed, high water temperature and low oil pressure, among other engine parameters. Engine speed is monitored for crank disconnect and overspeed. A bypass (not shown) permits low oil pressure and high water temperature override during the crank period and an additional adjustable period after crank disconnect. There can be an Engine Alarm Input/Output (not shown), which can be used to detect many types of faults. Certain engine components are communicatively coupled by a Controller Area Network bus (CAN bus). The engine ECM 302 monitors the CAN bus signal for problems during both cranking and running. If a problem is detected, the engine can shut down and a visual indication can be provided. Engine ECM (Electronic Control Module) 302 can be one provided with the 6.7 L, 173 HP QSB 6.7 diesel engine from Cummins, Inc., Columbus, IN, USA.

ACS ECU (Electronic Control Unit) 304 provides sensing, control, and actuation for an Autonomous Delivery Vehicle (ADV), such as ADV 110, both in autonomous mode and in remote mode. ACS ECU 304 can be disposed in electrical box 252. Parameters sensed by ECU 304 may include, without limitation, engine RPM, temperature, voltage; forward/reverse propel; wheel speed sensors rear left/right; steer left/right; steering angle, parking brake applied/unapplied; low fuel level; low hydraulic fluid level; premixed solution tank level—full, ¾, ½, ¼, empty; PTO Clutch ON/OFF; premixed solution spray pressure and flow rate; and spray valves ON/OFF left/right. Engine ECM 302 can be coupled via CAN bus to ACS ECU 304. ACS ECU 304 can receive operational data from the engine (e.g., engine 214) and can provide safety cut-off signals to engine ECM 302 from rear E-Stop button 316 or from forward bumper contact 346. Remote control interface 310 allows ADV 110 to be operated by a remote operator, who can maintain control of ADV using a wireless link 311. A suitable ECU 304 can be a CoreTek™ Model ECU-2415 Machine Controller from Hydraforce, Inc., Lincolnshire, IL USA. CAN bus 362 can communicate signals from all sensors (nodes) on the vehicle, each of which having a unique ID. Each sensor is called a Node and each has its own unique ID. All sensors feed back to the ACS ECU 304 using, for example, standard variable voltage or resistance.

For spray control, ACS ECU 304 controls and actuates valves performing right spray 326, left spray 328, and spray pressure control 330. Pressure sensor 314 detects the pressure of the premixed solution at the spray control valves, and spray volume is detected using spray flowmeter 312. By monitoring and adjusting spray arrangement (Left/Right), spray pressure, and spray volume along with ADV 110 speed and direction, the plants being sprayed (not shown) can receive a precise dosage of premixed solution. For steering, ACS ECU 304 detects steering parameters from steering sensor 318, and produces commands that compel the ADV to steer left 332, steer right 334, or move straight ahead. Left wheel speed 322 and right wheel speed 324 are parameters sensed by ACS ECU 304 to determine direction and speed of ADV (e.g., ADV 110) and, in response, to regulate and maintain ADV propulsion speed in the selected direction using forward propulsion 336 or reverse propulsion 338 actuators. Wheel speed sensors 322, 324 can also provide an input to ADV steering, according to the relative speed of a wheel relative to others.

ACS VCU 308 receives information from LiDAR sensor 348 and GPS data 352 to detect a present path and a planned future path through the adjacent plants (e.g., trees or vines or crops). LiDAR can provide more accurate path determination, in many cases, than can GPS, due to GPS inaccuracies, canopy density, and signal multipath. It is well-known in the art to employ LiDAR for object recognition. Forward-looking LiDAR sensor system 348 can be used to recognize objects in its environment, such as a row, or rows, of trees, the location of the tree trunks, and a forward path relative to the trees. Forward-looking LiDAR sensor system 348 also provides safety input such as when an object in the path comes within a predetermined distance from the front for ADV 110. The LiDAR proximity stop caused by forward-looking LiDAR sensor system 348, prevents accidental collision between the ADV and an object (e.g., a fallen tree limb, a human, or an errant farm animal). VCU 308 is coupled to engine ECM 302 and ACS ECU 304 with the CAN bus 362. VCU 308 senses data input to and output from the engine ECM 302, ACS ECU 304, and VCU 308 and directs that data back through radio 356 over link 358 to control van 360. VCU 308 also can route video camera video feed 350 back to mobile control center 120.

Clutch pressure sensor 320 senses the current state of hydraulic clutch 215 and, in cooperation with throttle control 340, ADV clutch engage 342 can be activated or deactivated. Among the safety features accorded to the ADV, aside from the LiDAR proximity stop, include front bumper contact stop 346 and rear E-Stop button 316. When front bumper 264 is contacted 346, the ACS ECU 304 causes the engine (e.g., ADV engine 214) to be shut off and parking brake to be engaged. Thus, front bumper contact stop can serve in a collision mitigation capacity. Similarly, when a user depresses the rear E-Stop button 316, ADV engine 214 is shut off and parking brake 344 can be engaged.

All of the foregoing data from GPS subsystem 352 and LiDAR subsystem 348 can be provided to mobile control center 360 over radio link 358 via radio subsystem 356. Data streams from video subsystem 350 also can be provided to mobile control center 360 over radio link 358 via radio subsystem 356. Additionally, sensed data from flowmeter 312, pressure sensor 314, steering sensor 318, clutch pressure sensor 320, and wheel speed (left/right) 322, 324 are transmitted to mobile control center 360. Front bumper 264 contact STOP activation state also is sent to mobile control center 360.

Mobile control center 360 also receives information from the CAN bus over link 358 regarding ACS ECU 304 and VCU 308. Thus, mobile control center 360 can monitor the information, command, and control data being created by ACS 300. Additionally, mobile control center 360 can issue command and control directives over link 358 to VCU 308 which, in turn, can cause ACS ECU to act to control the ADV. Among those directives transmitted to ADV systems including spray control 326, 328, pressure control 330, steering 332, 334, propulsion 336, 338, throttle control 340, clutch position (engage/disengage) 342, and parking brake position (on/off) 344.

Figure 4:
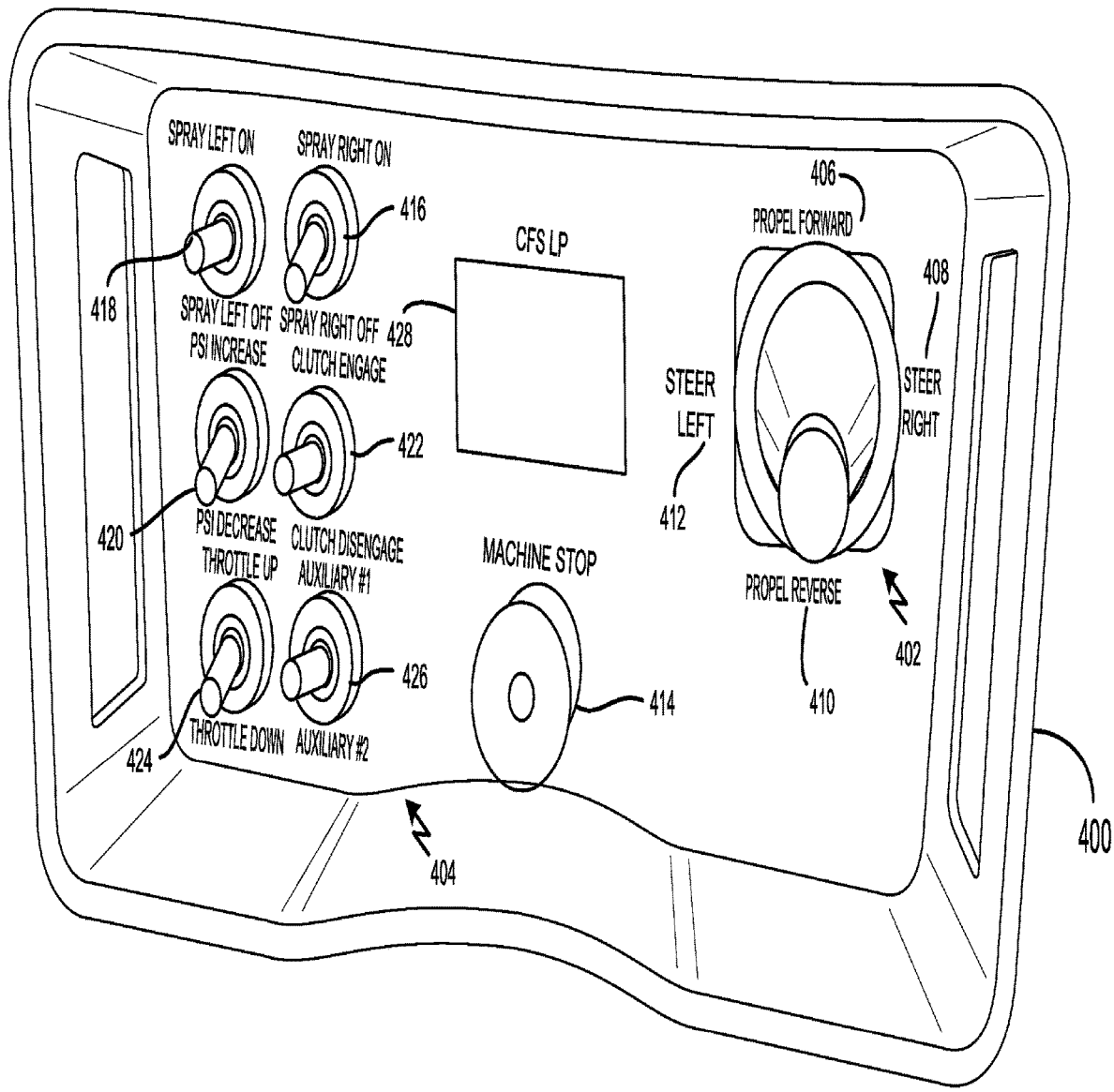
FIG. 4 is an illustration of a remote control interface for an ADV, according to the teachings of the present invention.

Turning to FIG. 4, an illustration of remote control interface 400 is shown. Interface 400 can be similar to remote control interface 310 in FIG. 3. Remote control interface 400 can have a multi-positional joystick 402 and a toggle switch panel 404. Multi-positional joystick 402 can have selections that enable a remote operator (not shown) to operate ADV 110, with propel forward 406 or propel reverse 410 command signals, as well as steer right 408 or steer left 412 command signals. The displacement of the joystick from mid-point serves to increase the degree of propulsion speed or steering. A conspicuous MACHINE STOP control switch 414 can be provided, for example, in the middle of interface 400, to initiate machine shutdown and parking brake set. Switch 414 can be similar in function and operation to E-Stop button 316 in FIG. 3.

Toggle switch panel 404 can include SPRAY RIGHT ON/OFF switch 416, and SPRAY LEFT ON/OFF switch 418, which causes the respective spray valve 222, 224 to open or to close. Spray control also can include spray pressure increase or decrease using PSI INCREASE/DECREASE switch 420. CLUTCH ENGAGE/DISENGAGE switch 422 can cause ADV 110 clutch (not shown) to engage and disengage, respectively. THROTTLE UP/DOWN switch 424 can actuate the throttle of engine 214 to increase or decrease, thereby respectively increasing or decreasing the speed of engine 214. AUXILIARY #1/AUXILIARY #2 switch 426. Other types and arrangements of switches also may be used. Visual confirmation of joystick- and switch-related can be provided on display 428. Radio control of ADV 110 from interface 400 can be accomplished by use of a radio transceiver model 4370 from LOR Manufacturing, Weidman, MI USA.

Figure 5:
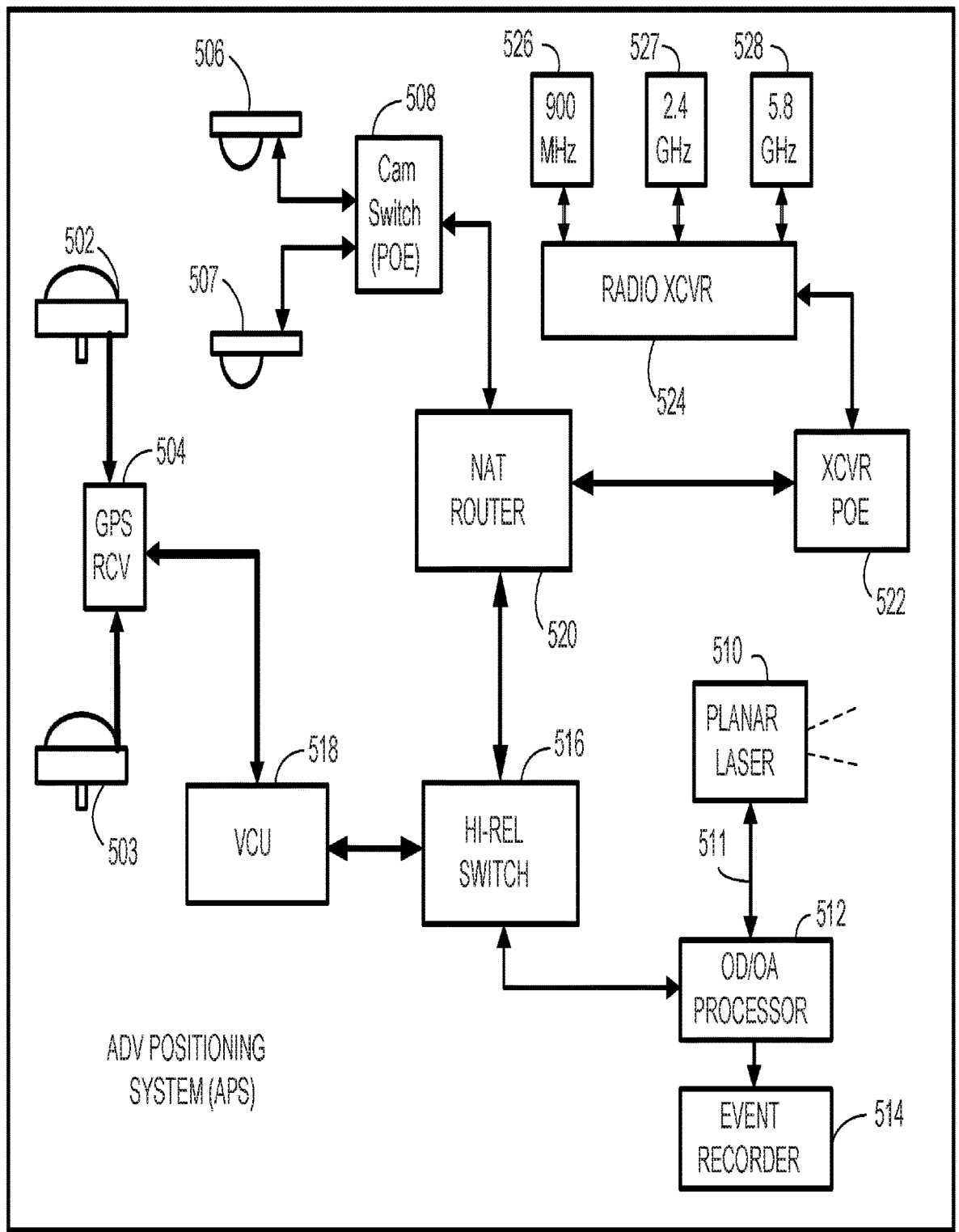
FIG. 5 is a block diagram of an ADV positioning system, according to the teachings of the present invention.

FIG. 5 illustrates ADV Positioning System (APS) 500. FIG. 5 can be taken in the context of FIGS. 1, 2, and 3. APS 500 can receive positioning signals from onboard subsystems for LiDAR 348 and GPS 352; can process the signals for ADV 110 positioning within a predefined area; can pass through signals from video 350 to mobile control center 120; and can autonomously navigate a predefined path within the predefined area using guidance provided by the positioning signals. In particular, GPS 352 subsystem can include fore GPS antenna 502 and aft GPS antenna 503, coupled to GPS receiver 504. GPS subsystem 352 can receive incoming GPS positioning signals from multiple ones of a global constellation of GPS satellites (not shown), and can provide horizontal and vertical positioning data to VCU 518. VCU 518 confirms that ADV 110 is within a preselected area specified by the GPS. In certain embodiments, GPS subsystem 352 can provide horizontal and vertical positioning data within 1 centimeter of accuracy. A predefined area can be, for example, at least a portion of an orchard, a vineyard, or a row crop, but also can be any other jobsite where ADV 110 provides a suitable spraying solution.

VCU 518 processes the incoming GPS data and compares it to predefined GPS data to find the correct path for ADV 110. The connections between antennas 502, 503 and GPS receiver 504 may be coaxial-type connections. The connection from GPS receiver 504 to VCU 518 may be serial data connections, such as an RS-232-type, or an IEEE 802.3-type, serial data connection. In an orchard application, GPS subsystem 352 provides VCU 518 with positioning data, which can be compared to predefined area information previously recorded by mapper vehicle 130. Prerecorded GPS data can be compared to sensed GPS data, and corrections can be made to keep ADV 110 true to the intended path.

Additionally, ADV 110 forward path identification and verification also can be provided using the LiDAR (light radar) subsystem 348, which can include planar laser 510 (sensor) coupled to Obstacle Detection/Obstacle Avoidance (OD/OA) processor 512 using an Ethernet-type connection. Planar laser 510 can communicate with OD/OA processor 512 in IEEE 802.3 format. In an orchard application example, OD/OA processor 512 causes planar laser 510 to illuminate the forward path of ADV 110, identifying incident targets (e.g., trunks of trees) in the orchard, and processes reflected return signal from planar laser 510 to provide both target and ADV 110 positional information, which information is transmitted through IP-67 rated, high reliability (HI-REL) packet switch 516 to VCU 518.

Although positional information can be provided by GPS subsystem 352, the positional information from LiDAR subsystem 348 can mitigate errors in GPS navigation due to satellite obscuration (e.g., tree canopy and other interference). VCU 518 interprets the data provided by OD/OA processor 512 to determine the position of orchard trees, to find a center path between the trees, and to verify that the current path comports with a predefined path data provided to VCU 518 by mapper vehicle 130. The predefined path information can include the positions of targets, such as row(s) of trees, within the predefined area, and a path to follow between clusters (rows) of targets (trees) within the predefined area. Moreover, VCU 518 can use data from OD/OA processor 512 to detect if there is an obstacle in the path of ADV 110 and, if so, to shut down ADV engine 214. Thus, LiDAR subsystem 348 also can act as a collision avoidance subsystem.

Video subsystem 350 can include fore video camera 506 and aft video camera 507, which provide packetized video signals to camera switch 508. The packetized video signals can be representative of the respective visual areas proximate to ADV 110. Also, camera switch 508 can be a Power Over Ethernet-enabled (POE) switch, providing operating power to cameras 506, 507. Video subsystem 350 also can use a DC/DC converter (12V/48V) such as a model Supernight, LC-123 from E BEST TRADE LLC, Portland, OR USA. Video packets transmitted from cameras 506, 507 can be routed through router 520, then through HI-REL packet switch 516 to VCU 518. VCU 518 in turn routes the video stream to radio transceiver 524, and then to mobile control center 120. Video packets can be in Ethernet format.

GPS antennas 502, 503 can be Zephyr 2 (ruggedized) antennas and GPS transceiver 504 can be Model BX982, all from Trimble Navigation Limited, Sunnyvale, CA USA. Cameras 506, 507 can be model M-3114 from Axis Communications AB, Lund, SE. Camera switch (POE) 508 can be model VHDC-24V-50 W from Rajant Corp., Malvern, PA USA. HI-REL switch 516 can be an Octopus switch, Model 5TX-EEC, from Hirschmann (a Belden Company), Neckartenzlingen, Baden-Wurttemberg, DE. NAT Router 520 can be a model EKI-6528TPI NAT router from Advantech America, Milpitas, CA, USA. Planar laser 510 can be a model VLP-16 3D LiDAR sensor from Velodyne LiDAR™, Morgan Hill, CA USA. Alternatively, a model LMS-151 from Sick AG, Waldkirch im Breisgau, DE may be used.

Coupled to OD/OA processor 512 can be event recorder 514. Event recorder 514 records data from OD/OA processor 512, as well as CAN bus feed from ACS VCU 304. Event recorder 514 can have Ethernet connections (e.g., RJ-45, M-4, and M-12), serial connections (e.g., RS-232, and USB), CAN connections (e.g., J1939), and SVGA connections. Like a cockpit data recorder in a commercial aircraft, event recorder 514 can collect and save predetermined event data over a predetermined temporal window, and may record over the saved data during subsequent temporal windows. Event recorder 514 data may not be manually manipulated, and can provide helpful information regarding ADV 110 systems states in a case of mishap or misfortune. Radio subsystem 356 can include transceiver packet switch (POE) 522 coupled, and providing power, to radio transceiver 524. Radio transceiver 524 can be capable of transmitting and receiving signals in multiple frequency bands. Accordingly, radio transceiver 524 may include multiple antennas, such as a 900 MHz antenna 526, a 2.4 GHz antenna 527, and a 5.8 GHz antenna 528. Multi-frequency transceiving permits high-reliability, robust, and redundant communication between an ADV ACS 300 and APS 500, and mobile control center 360. POE transceiver packet switch 522 can be a model VHDC-24V-50 W from Rajant Corp., Malvern, PA USA. Radio transceiver 524 can be a model LX-4 from Rajant Corp., Malvern, PA USA. 900 MHz antenna 526 can be a Model 08-ANT-0922 from MP Antennas, LTD, Elyria, OH USA. 2.4 GHz antenna 527 can be a Model TRAB24003P and 5.8 GHz antenna 528 can be a Model TRAB58003P, both from Laird USA, Earth City, MO USA.

When cellular coverage permits, a digital cellular radio network can be used for inter-vehicle communication. Under current regulations, cellular coverage can be provided by a small transceiver for each vehicle under a special subscription plan from a cellular telephone company. Because commercial cellular companies are licensed by the Federal Communications Commission to provide powerful signals from a cellular tower, for example, 500 watts per sector (effective radiated power), the cellular signal has little difficulty penetrating a tree canopy. Transmitted radio signals are received from a transmitting vehicle by a first local cellular tower. Return radio signals can be transmitted to selected receiving vehicle from a second local cellular tower. The first local cellular tower may be the same as, or different from, the second local cellular tower, A "penalty" of using cellular systems is the slight time delay (e.g., 250 milliseconds) between sending and receiving radios (and vice versa)

Alternatively, when a cellular service is not available or is unreliable, an analog mesh radio network may be used at a given job site. A mesh radio network allows all vehicles to communicate with each other directly, rather than sending a signal through a base station (point-to-point network). The mesh network can be much faster because the signal can go directly from the sender to the receiver. A mesh network also allows for much greater radio coverage because the messages do not have to go directly to the desired receiver vehicle. Every radio in the mesh can act as a repeater, so if first and second vehicles do not have a strong connection, the signal can be routed through a third vehicle (or more) to reach the desired destination. In embodiments, radios can automatically reroute the signal as necessary, with no human interaction needed.

One vendor of mesh radios can be Rajant Corporation, Malvern, PA USA. Rajant radios typically are designed to meet the military standards, and the harsh environments, for example, of oil, mining, and utilities services, so they are suitable for use in the harsh, dusty, and moist environment of agricultural applications. As one example, a Rajant Kinetic Mesh® Network can be used, with the advantage of interoperating with other Internet Protocol (IP) based equipment including GPS, video feeds, and computer signals. See, for example, information regarding a Rajant Kinetic Mesh® Network at http://www.rajant.com/technology/what-is-rajant-kinetic-wireless-mesh/ and BreadCrumb® Wireless Nodes at http://www.rajant.com/technology/breadcrumb-wireless-nodes/. Other networks and wireless nodes may be used, of course. Such radios can operate on 900 MHz, 2.4 GHz, and 5.8 GHz unlicensed frequency bands, and vehicles of present embodiments may include radio systems capable of operating at multiple frequencies. For example, a radio system operating at 900 MHz can be used to penetrate through tree canopies, for example, in orchard operations, while 5.8 GHz signals can travel farther if there is line-of-sight communications (e.g., vineyard applications. The more power used to transmit the signals, the better the penetration through a tree canopy. However, a "penalty" of using mesh networks can arise from current Federal Communications Commission restrictions on the power used by a unit on unlicensed RF frequencies, e.g., about 1 watt.

Figure 6:
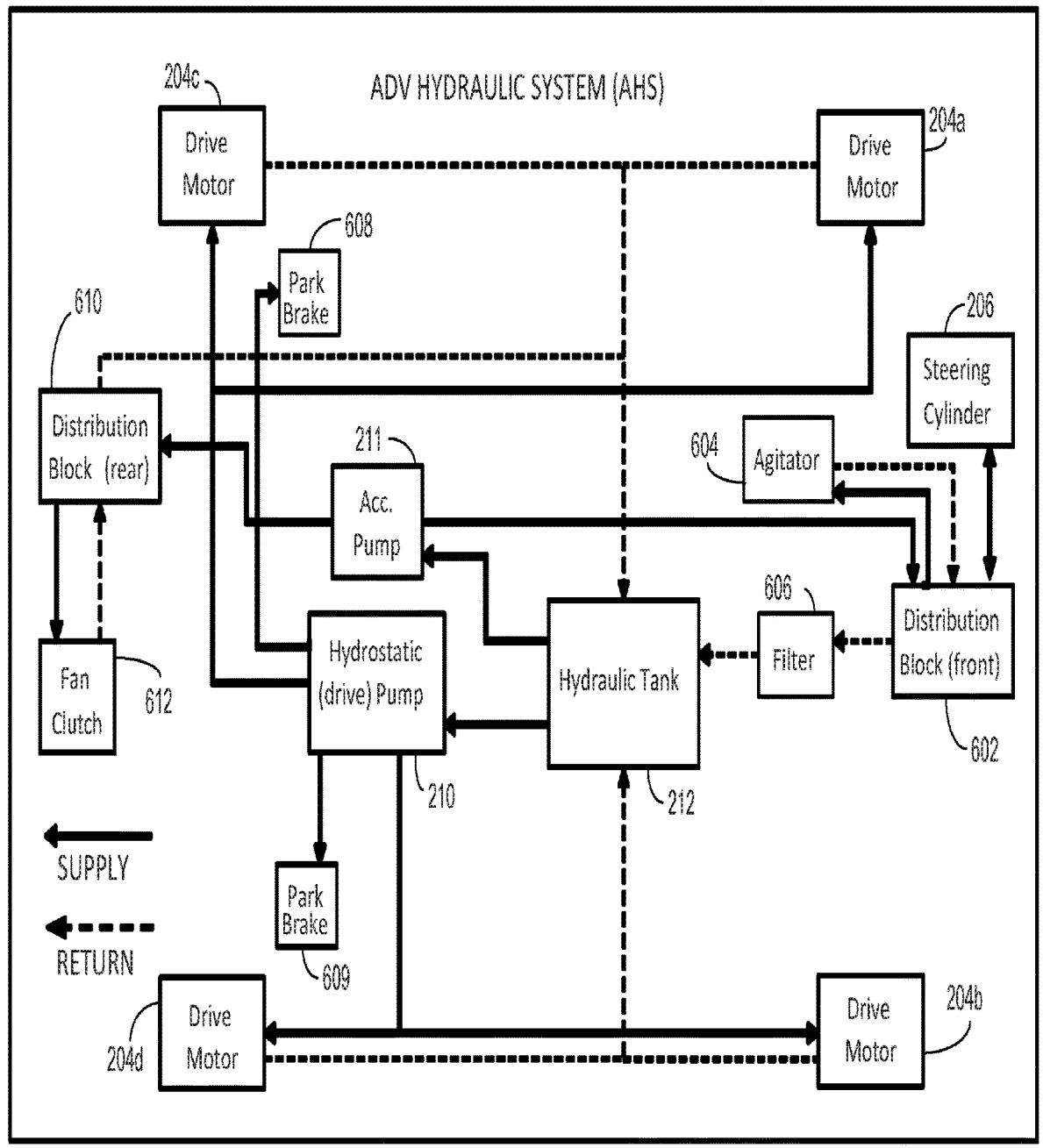
FIG. 6 is a block diagram for an ADV hydraulic system, according to the teachings of the present invention.

FIG. 6 is a block drawing illustrating ADV Hydraulic System (AHS) 600. FIG. 6 will be described with the assistance of FIG. 2. AHS 600 is a subsystem that supports ADV 110 locomotion, steering, and spray systems. Each of the four wheels 202*a-d* of ADV 110 can be driven by hydraulic motor 204*a-d*, which are pressurized by hydraulic pump 210. Hydraulic pump 210 also provides pressure to parking brakes 608, 609. While the hydraulic pump is running, parking brakes 608, 609 are pressurized to be OFF. However, when hydraulic pump 210 stops running, such as by an E-Stop, parking brakes 608, 609 can be depressurized and set ON using a mechanical, device such as springs (not shown). Other parking brake arrangements are possible. In general, while the diesel engine is running, the brakes can be set to ON or OFF by a switch. If there is no FORWARD or REVERSE command, the switch will depressurize the brake system, setting the brakes ON. However, if a FORWARD or REVERSE command is received, the switch will be set to pressurize the brake system, setting the brakes OFF, and allowing wheels 202*a-d* to turn. Hydraulic accessory pump 211 can pressurize fore distribution block 602 and aft distribution block 610. Hydraulic accessory pump 211 can supply hydraulic pressure to operate steering cylinder 206, agitator motor 604 through fore distribution block 602, and fan clutch 612 through aft distribution block 610. Steering cylinder can be a single-ended or double-ended hydraulic steering cylinder, although in the described embodiment in FIG. 2, a single-ended steering cylinder is used. Agitator motor 604 provides a uniform mixture of chemicals or additive to the water tank in the system, so that the spray achieves a consistent concentration. Agitator motor 604 can be a model no. 2100 (P/N: P2100C486GDZA07-87) from Permco, Inc., Streetsboro, OH USA. Filter 606 extracts dirt, debris, and metal shavings from the hydraulic fluid. Filter 606 can be a filter series RT (P/N: RT2K10P24NNYZ) from Schroeder Industries, Leetsdale, PA USA. Filter 606 can use a type KZ5 filter insert, also from Schroeder Industries. Fan clutch 612 controls the operation of dispersal fan 230 and solution pump 220. When fan clutch 612 is engaged, dispersal fan 230 and solution pump 220, can be made to operate, while when fan clutch 612 is disengaged, dispersal fan 230 and solution pump 220 are not operating.

Figure 7:
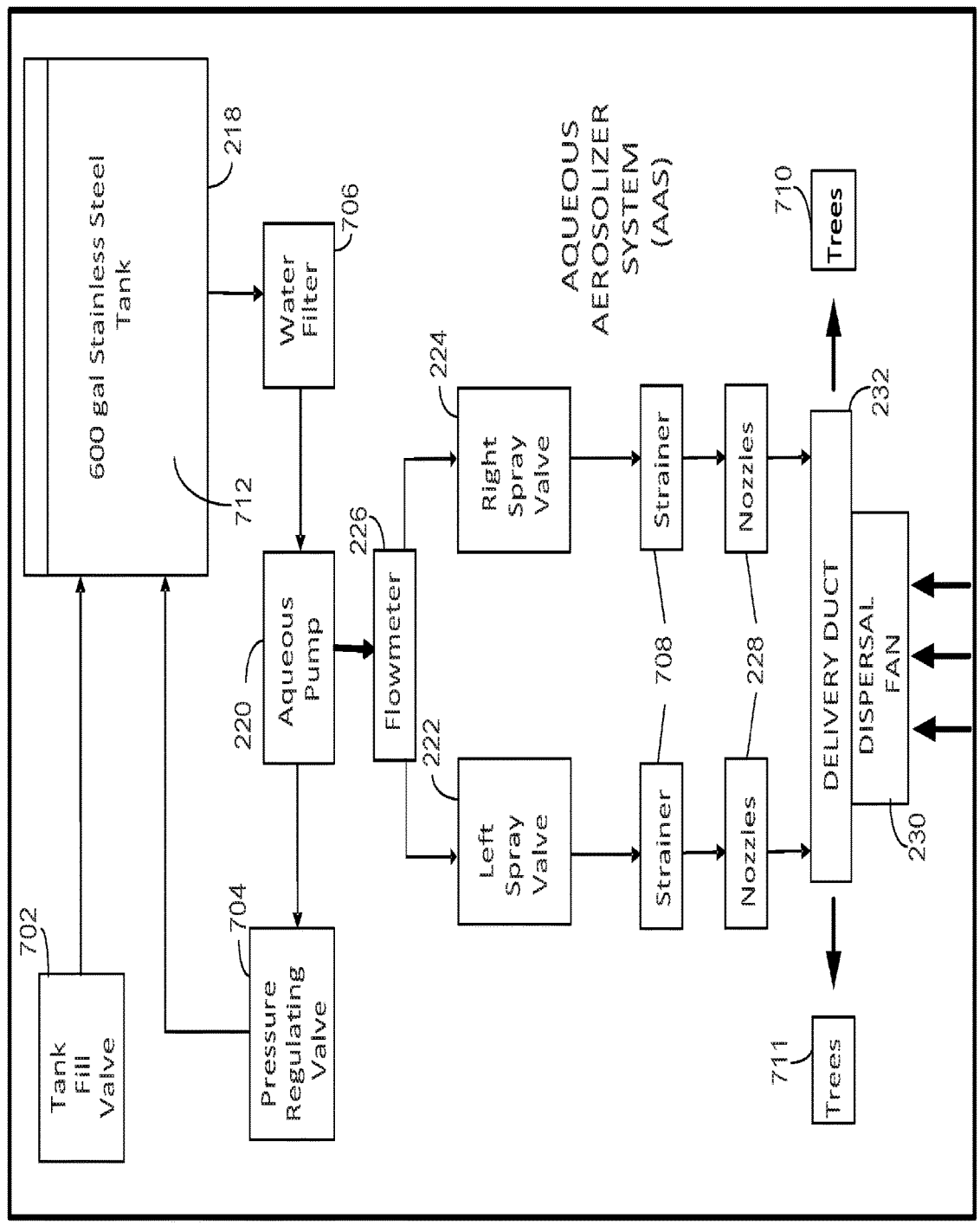
FIG. 7 is a block diagram of an ADV aqueous aerosolizer system, according to the teachings of the present invention.

FIG. 7 is a block illustration of an embodiment of an implement actuator, for example, an aqueous aerosolizer subsystem, such as subsystem 217 in FIG. 2. An implement actuator is any subsystem, hydraulic or mechanical, that is used for moving or controlling a mechanism that is configured to perform a predetermined agricultural function. FIG. 7 can be described within the context of FIG. 2. Tank fill valve 702 is used to admit aqueous solution 712 to holding tank 218. Tank 218 can be a 600 gallon stainless steel tank. Aqueous solution 712 may be a pre-mixed aqueous solution, although other types of solution may be used. Aqueous solution 712 can be a chemical solution such as a fertilizer, a pesticide, a fungicide, or a functional combination thereof. In use, premixed solution 712 can be drawn through water filter 706, which is coupled to the inlet port of solution pump 220. Filter 706 can have a 20-mesh screen (about 0.0331 inches). Pressure regulating valve 704 can be used to regulate the pressure generated at the outlet port of pump 220. Pressure regulating valve 704 can be a model LOEWS-DF1 (1.5 inches) from KZ Valve, Greenwood, NE USA. When valve 704 is fully open, pump 220 can recirculate premixed solution 712 to tank 218, through filter 706 and to the pump inlet, providing negligible output pressure. When valve 704 is fully closed, all output of pump 220 is provided to its outlet port, providing full pressure. Typically, pressure regulating valve 704 can be manipulated so that a measured amount of premixed solution 712 can be provided at a preselected pressure to flowmeter 226. Flowmeter 226 can be used to measure the flow rate or quantity of premixed solution 712 being provided from the outlet of pump 220 to open/shut-type left spray valve 222 and right spray valve 224. When left spray valve 222 is opened, premixed solution 712 can be pumped through valve 222 to strainer 708, and then to left-side nozzles 228. Strainer 708 filters any entrained dirt and debris from the pumped aqueous premixed solution 712, so that left-side nozzles 228 are not impaired thereby. Strainers 708 can be a 30 mesh screen (0.0234 inch). Right spray valve 224 operation can be functionally the same as left spray valve 222 relative to strainer 708 and nozzles 228. Operation of valve 222 or 224, or both deliver a predetermined solution volume of premixed solution 712 to nozzles 228. Forcing the predetermined solution volume of premixed solution 712 through nozzles 228 causing premixed solution 712 to become aerosolized. An implement can be a tool, device, or apparatus, configured and used to perform a predetermined agricultural task. As such, dispersal fan 230 can be used to draw a predetermined air volume into the delivery duct 232. By mixing the predetermined solution volume with the predetermined air volume, the resulting aerosolized mixed solution can be dispersed at a rate, and on a side, suitable, for example, for treating trees 710 or 711, or both. Two-sided spraying is typically used when ADV 110 is operating between two rows of trees 710, 711. One-sided spraying can be used to apply aerosolized mixed solution to a single row of trees 710 or 711 disposed on one side or the other of ADV 110. As noted previously, predetermined agricultural tasks can be realized, for example, using the corpus of ADV 110, which may be coupled to an implement actuator which, in turn, is coupled to an implement configured and used to perform a predetermined agricultural task. ADV 110 may be embodied as a single-purpose apparatus or as a multi-purpose apparatus with interchangeable mechanisms configured to perform multiple predetermined agricultural tasks.

Figure 8:
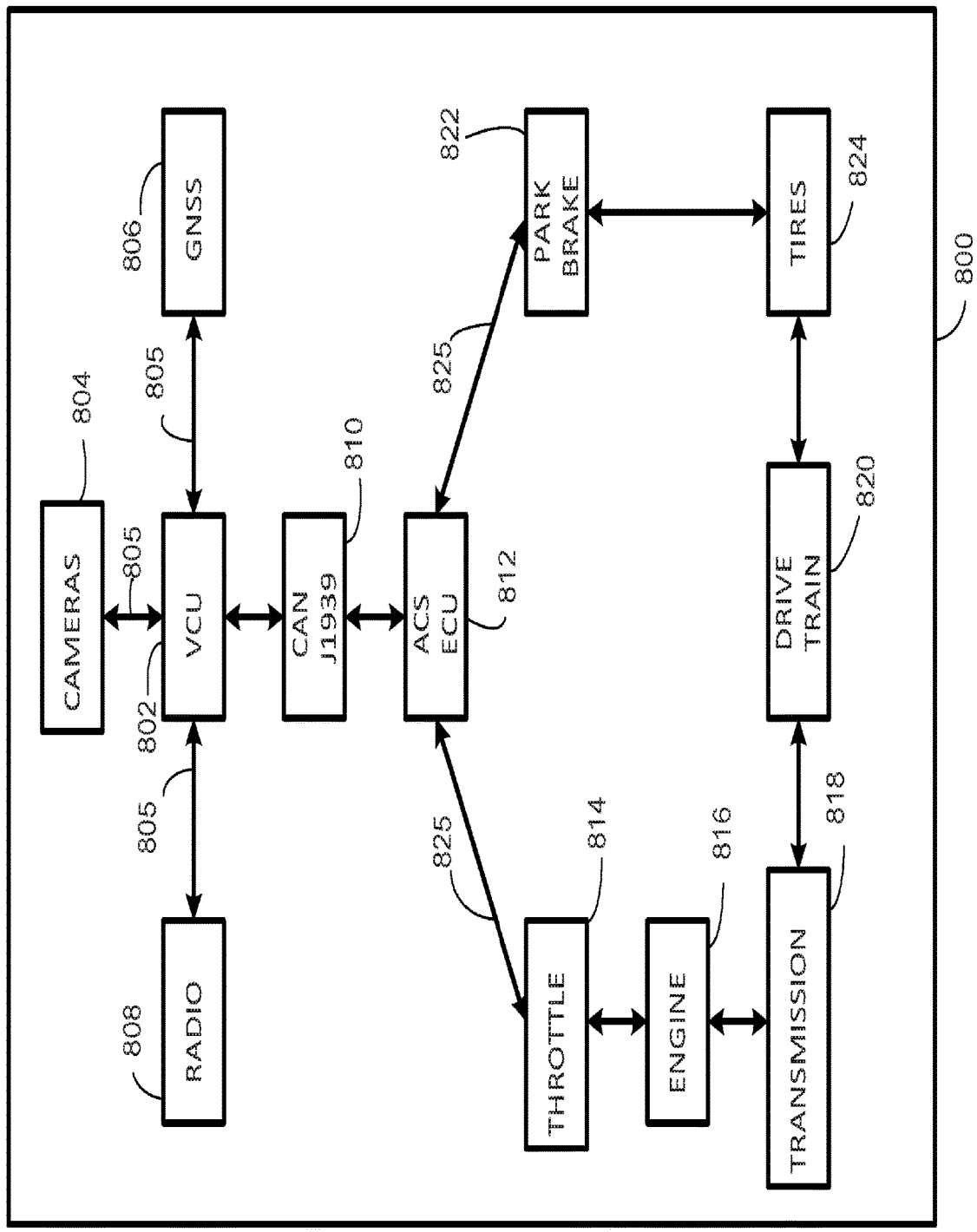
FIG. 8 is a block diagram of the ADV teleoperation control system, according to the teachings of the present invention.

Turning to FIG. 8, an embodiment of overall teleoperation control system 800 for ADV 110 is described. Standards for busses used in system 800 include standard IEEE 802.3 (for convenience, "Ethernet"), a collection of standards describing local area network composition and operation, and standard SAE J1939 (CAN), Recommended Practice for a Serial Control and Communications Vehicle Network, which is the vehicle bus recommended practice used for communication and diagnostics among vehicle components. Both of these standards are incorporated into this document in their entireties. System 800, then, employs two types of busses, each of which being coupled to VCU 802, Ethernet connections 805 and CAN bus connections 810, 825. Cameras 804 are coupled to VCU 802 and thus to radio 808, and provide remote viewing of the areas of ADV 110 operation (fore and aft) by the operations supervisor (e.g., van operator). GNSS system 806 identifies the horizontal and vertical location and position of ADV 110 within a predefined area of an orchard, and provides tracking capability of ADV 110 as it drives other predefined paths, as selected and identified by VCU 802. Positioning and path information, as well as ADV 110 operating parameters, are relayed to mobile control center 120 by radio 808. Radio 808 receives command and control information from mobile control center 120, which may cause VCU 802 to begin, modify, or terminate operation in a selected subsystem. Cameras 804, GPS 806, and radio 808 can be coupled to VCU 802 using the Ethernet switched packet bus 805.

VCU 802 also receives inputs and transmits inputs to the mechanical portion of ADV 110 by communicating with the hardware automation interface, CAN bus controller 810. Controller 810 can be coupled to the ECU 812, which can be functionally like ACS ECU 304. ECU 812 issues commands to machinery components, monitors the state of ADV 110 physical systems, and receives response and state data from ADV 110 physical systems. In particular, ECU 812 can increase, decrease, or shut off throttle 814, causing engine 816 (which can be like engine 214) to speed up, slow down, or stop, respectively. Transmission 818 and drive train 820 can send back state information, during operations, and in response to clutch operation. Tires 824 can be caused to turn forward or reverse by operation of drive train 820, in response to throttle 814. In addition, ECU 812 can cause parking brake 822 to be set, or released, in response to commands from ECU 812 or VCU 802.

Figure 9:
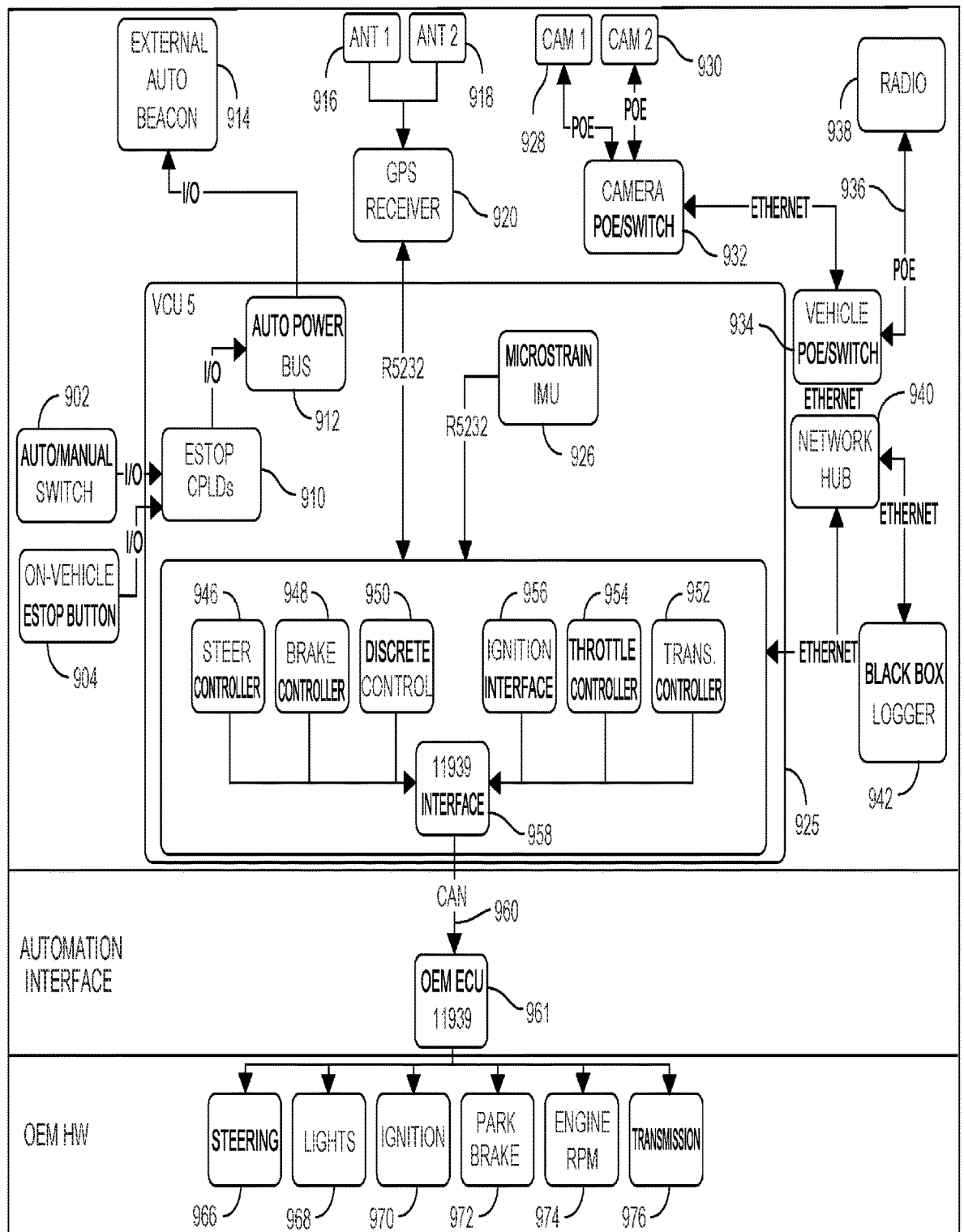

FIG. 9 depicts control bus structure 900 including the several busses, which may be used to communicate within an ADV 110, including with particularity, VCU 802 and ACS ECU 812. Auto/Remote button 902 can be wired as a standard I/O arrangement into VCU Estop CPLDs 910, along with Vehicle On/Off 904, and E-Stop button 906. VCU Estop CPLDs 910 provide action via an I/O bus to VCU Auto Power Bus 912. When ADV 110 is activated, VCU Auto Power Bus 912 actuates external auto beacon 914 via I/O bus, indicating that ADV 110 is in an operational mode. Fore and aft GPS antennas 916, 918, respectively, can be coupled to via a serial link GPS receiver 920 which, in turn, is coupled to the VCU control unit 925, for example, using an RS-232 serial link. Inertial measurement unit (IMU) 926 may be coupled to VCU control unit 925 using an RS-232 serial link, as well. IMU 926 can be a model 3DM-GX4-25 MicroStrain® Inertial Measurement Unit, from Lord Sensing Systems, in Williston, VT. IMU 926 includes a tri-axial accelerometer, a gyroscope, a magnetometer, temperature sensors, and a pressure altimeter. IMU 926 determines pitch, roll, yaw, and heading of ADV 110, acting as a static and dynamic attitude, heading, and reference system. As described above, Ethernet-capable fore and aft cameras 928, 930 can be powered and switched by camera/POE switch 932. Vehicle POE/switch 934 can bidirectionally communicate Ethernet signals from camera/POE switch 932, as well as Ethernet signals over POE bus 936 from radio 938. Vehicle POE/switch 934 bidirectionally communicates with network hub 940 using the IEEE 802.3 protocol. Information from the network hub 940 can be transmitted to the "Black Box" event recorder 942. Event recorder 942 also receives data from VCU control unit 925. Within VCU control unit 925 are several controllers, which provide operational controls to the mechanical system of ADV 110 by way of CAN bus 944.

Based upon the input data from GPS receiver 920, IMU 926, fore and aft cameras 928, 930, and radio 938, VCU control unit 925 can provide command and control signals to keep ADV 110 on a predetermined path. Such command and control signals can include, without limitation, steering controller 946, brake controller 948, discrete controller 950, transmission controller 952, throttle controller 954, and ignition interface 956. Signals from VCU control unit 925 can be conveyed through J1939 interface 958, over CAN bus 960 to ECU interface 961, which also can be a J1939 interface. The command and control signals from VCU controller 925 can provide command and control for steering 966, lights 968, ignition 970, parking brake 972, engine speed 974, and transmission state 976.

Figure 10:
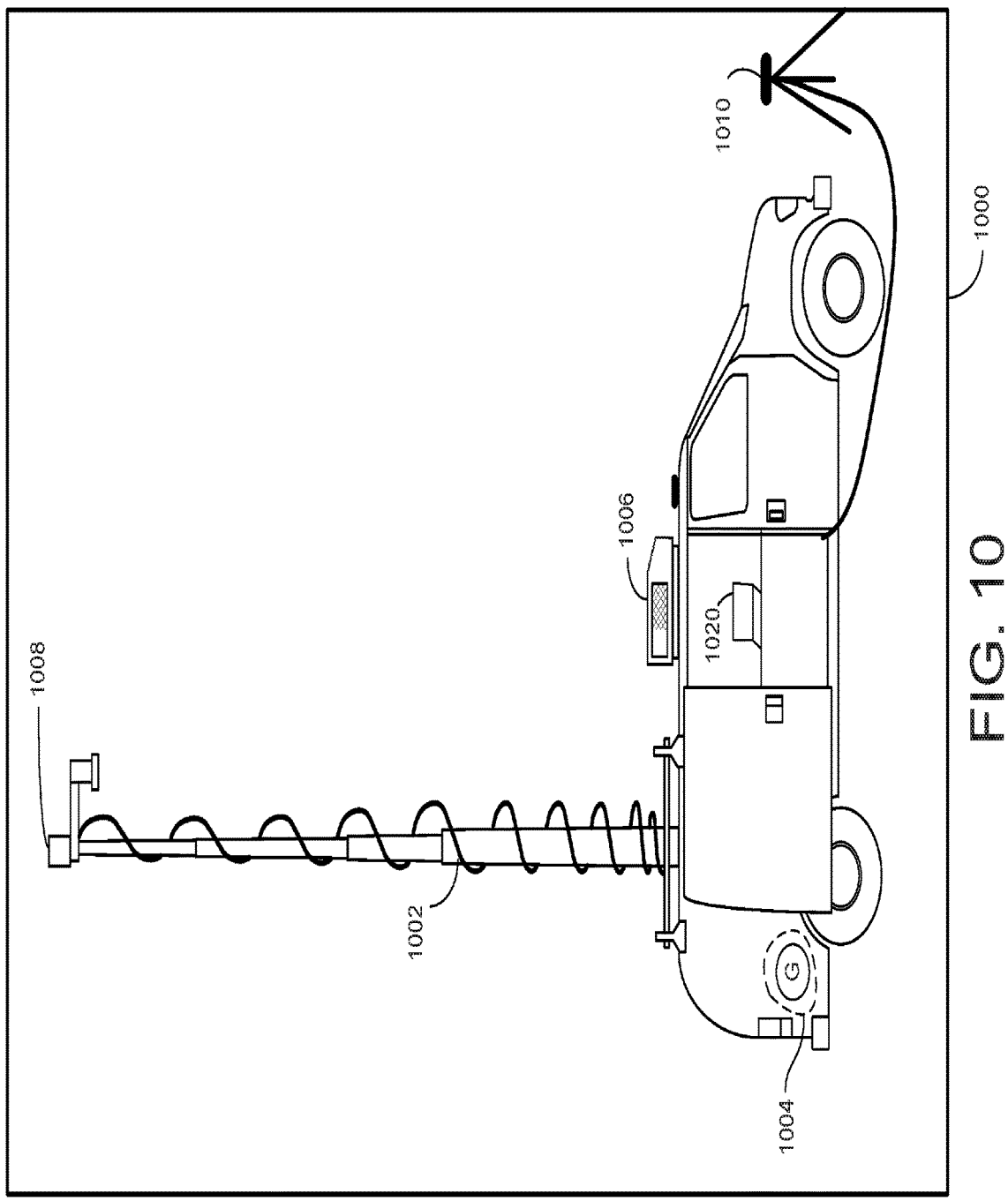

FIG. 10 depicts an embodiment of mobile control center 1000. Mobile control center 1000 can be functionally like control center 120. Components of a control center 1000 may include, inter alia, computer 1020 equipped with, at least, command and control software, and a geolocation system, such as GPS. Additionally, the control center 1000 can be equipped with multiple displays for efficient monitoring, handheld voice radio, touch screen interface, and basic office supplies. Mobile control center 1000 can be a preconfigured vehicle with an extendable, pneumatic mast 1002, which can be extended up to about 60 feet. This height can give a free line-of-sight range of about 3 miles, or about 0.75 miles of range in dense tree canopy. Communication range within an orchard may vary due to the predefined area size, tree density, vegetation canopy density, weather, multipath, mast height, transmission frequency, and other factors. Other configurations and frequencies are possible. This configuration of mobile control center 1000 is suitable for bidirectionally communicating with one or more ADVs 110, which may be dispersed over a predefined area of an orchard. Mobile control center 1000 can house the operator that oversees entire operation. In addition, mobile control center 1000 can contain command and control software, can control one or more ADVs while in Autonomous Mode, and can monitor the status of the one or more ADVs. Mobile control center 1000 can have a separate 7 kW generator 1004 aboard to provide power for the electronics, computer, and radio equipment in mobile control center 1000. Other generator power capabilities can be provided. Heating and air conditioning equipment 1006 may be provided in mobile control center 1000 for operator comfort. Interior and exterior AC connections also may be provided.

Mobile control center 1000 can employ a single human operator (not shown) to operate multiple vehicles (such as ADV 110) at one time using computer 1020. The operator can remotely make changes to the operating parameters of a selected vehicle, and can remotely monitor all of the gauges pertaining to the selected vehicle. The operator of the control center 1000 can monitor, without limitation, all of the vehicles fluid levels, critical components temperature, radio signal strength, and speeds. If any of these items are out of tolerance, the operator can shut down, slow, or pause the vehicle from computer 1020, so necessary action can be taken. Additionally, the operator can use computer 1020 to monitor many of the electronic components on the outside vehicles, such as cameras, GPS, computers, and individual sensors. Again, they are able to take any necessary action to fix any problem that arises. Although mobile control center 1000 may employ a simple laptop computer 1020, for example, a custom-made programmable electronic controller may be used. In the example of laptop computer 1020, the computer could be coupled to a network router/hub to wirelessly tie into the remote vehicle's network. The command and control software may be downloaded onto laptop computer 1020 in many ways, for example, in the field, or back at a field shop. Laptop computer 1020 may be kept running during the entirety of the task in the field. Instead of a laptop, a "tower" or "desk" computer configuration also may be used. In the example of a custom controller, all electronic components could be coupled into this controller. Only the software necessary to control the vehicle would be run.

The command and control software that is run in mobile control center 1000 can be designed to work in coordination with software on each individual vehicle, such as ADV 110. Mobile control center 1000 will send specific path, speed, and action commands to the vehicle. The vehicle then takes those commands and controls the physical vehicle using commands, including without limitation, steer, propel, rpm, on/off, and the like. Typically, mobile control center 1000 gives out a general command, while the individual vehicle software controls the actual vehicle in order to obey the command given by the control station. This allows for variation in each vehicle, and for easy changes of implementation, all while keeping the same control center software. Command and control software which may be used in computer 1020 of control center 1000 can set a predetermined path complete with speeds, rpm's, and actions for the vehicle(s) before sending the commands to the vehicle(s). This path will be highly dependent upon the number of vehicles in the serviced area. Overlap of individual vehicle (e.g., ADV 110) actions can be substantially avoided if not precluded. Overlap of paths may cause over-spraying or over-delivery of applied materials. For example, setting the path before sending vehicles out to work is a first step in preventing overlap and that the vehicles are covering the field in the most efficient way possible, for example, by minimizing time spent turning at the end of a row. The predetermined path will also determine precise start times for each vehicle, so once two vehicles reach the end of a row, they do not try to turn simultaneously resulting in a collision. One vehicle will reach the end and turn before the other is ready to make its turn. Once the path has been planned and vehicles are moving, the command and control software in mobile command center 1000 can compensate for any anomalies that may occur, such as a vehicle breaking down and having to be removed from the field. If this happens, the operator will have the software "re-plan" the paths for remaining vehicles. The command and control software will then take into account what rows have been covered, what rows still need to be covered, the number of vehicles left, and the location of those vehicles to decide the most efficient paths.

Mobile control center 1000 can transmit or receive on a selectable frequency, such as on a 900 MHz band, or a 2.4 GHz band or a 5.8 GHz band, according to conditions in the field. Antennas 1008 for the mobile control center radio can be disposed on mast 1002. Of course, other frequencies may be used. In addition to ADV 110, mobile control center 1000 can bidirectionally communicate with mapper vehicle 130, typically to collect mapping information (e.g., GPS and LiDAR mapping signals) about a predefined area. After being received from the mapper vehicle 130, mobile control center 1000 can store all mapping data for at least a predefined area (e.g., an orchard or a portion of an orchard). Control center 1000 can send mapping data to ADV 110 on-the-fly, for at least a portion of a predefined area, or for at least one predefined area, depending upon the amount of memory made available in the VCU of ADV 110.

In some embodiments, mobile control center 1000 can be paired with one or more repeater trucks (not shown), which may be disposed along the periphery of a predefined area, for example, in which one or more ADVs are treating their respective predefined areas. A repeater truck may be a van such as mobile control center 1000, or some other vehicle, which will be disposed in the field. Nurse truck 140 can have a radio repeater, which can be useful to relay and receive signals from ADV 110 or mapper vehicle 130 to mobile control center 120, in the event of low level or compromised signals due to distance, signal strength, multipath, canopy density, tree density, weather, or other causes of impaired signals. Mobile control center 1000 may have a GPS receiver and GPS antenna 1010 may disposed on a tripod outside of the van, for example, up to 25 feet away, and coupled to the GPS receiver by a coaxial cable. In some embodiments, control center 1000 may be a permanent structure (such as a building), or can be fully mobile (such as a truck or a van).

Figure 11:
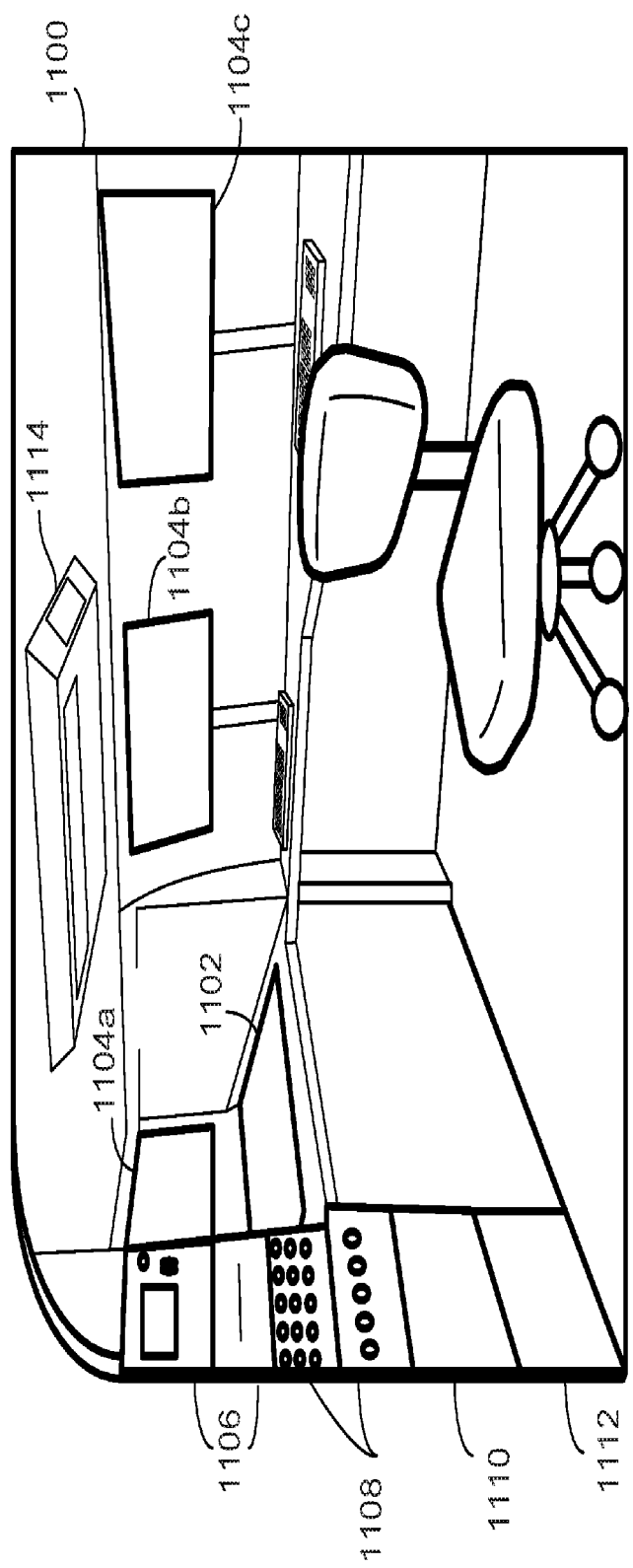

FIG. 11 illustrates an embodiment of an interior view of mobile control center 1000, exclusive of the driving cab. Mobile control center 1000 houses at least touch screen computer monitor (e.g., 32 inches) 1102, high definition monitors (e.g., 24 inches) 1104*a-c*, and a rack-mounted frame carrying base radio 1106, Ethernet hub 1108, mobile control center computer 1110, and mobile control center back up battery 1112. Also seen is an inside view 1114 of heating and air-conditioning device 1006. Touch screen monitor 1102 allows a mobile control center operator/supervisor to make on-the-fly changes to the operation of ADV 110, including, without limitation, STOP, speed (e.g., throttle up/down), clutch (engaged/disengaged), heading, steering, spraying side, flow, and flow rate, and ADV light configurations. All system alerts and warnings are received and displayed on monitor 1102. Moreover, high-definition monitor 1104*a* can be used by the mobile control center operator/supervisor to display live video feeds from the fore/aft cameras 240, 242 of ADV 110, in a selected display configuration, allowing mobile control center operator/supervisor to have complete situational awareness of the state of the system 100 including ADV 110.

In certain embodiments, base radio 1106 can be used to communicate with all vehicles of system 100. In particular, base radio 1106 receives radio feed from ADV 110, which includes video, Ethernet, CANnet, and LiDAR information transmitted by ADV200. Base radio receives GPS and LiDAR geolocation information about a pre-defined area, which is stored by computer 1110, and which creates the predefined path to be taken by ADV 110. Base radio 1106 can also bidirectionally communicate verbal signals among the operators of mapper vehicle 130 and nurse truck 140, as well as other handheld radios in the field. Computer 1110 can be a tower-style Hewlett-Packard Z230 workstation, having an Intel® i7-4790 CPU @ 3.60 GHz, 8 GB RAM, and a 1 TB hard drive, using a 64-bit operating system. Of course, other, comparable computers may be used, and specifications may change as technology progresses.

Mobile control center 1000 can also have a video surveillance functionality. This video surveillance function may be used to view a remote vehicle (such as ADV 110) and its immediate surroundings while operating, or during, for example, an E-Stop or system error. The operator is able to use the video feed from, for example, fore and aft cameras 928, 930 in FIG. 9, to visually inspect a selected vehicle for a fault causing an E-Stop or system error, as well as view proper progress of ADV 110 on its given path. This reduces the need for a human operator to physically inspect the vehicle. An IP-based camera network can be used, and the video feed from ADV 110 can be streamed over a private mesh radio network, as well as a commercial cellular network. Although there are numerous suitable video systems, embodiments herein can use an outdoor video system produced by Axis Communications AB, Sweden, Lund. Because a video feed, particularly of multiple ADV 110, can use a substantial amount of bandwidth, embodiments allow the video stream to be selectively turned off to help maximize radio bandwidth. In some embodiments, a mesh radio network can be configured into two separate LANs (local area network), to separate command and control signals from the video streams. In other embodiments, using a combined radio and video feed, the radios will automatically drop the video feed to free up bandwidth for the more important command and control signals, once the signal strength degrades to a predetermined level, Adverse event monitoring of ADV 110 is possible because the system automatically records the video feed from a set time before and after an E-Stop is triggered. Video feed, though, can be important in monitoring the acceptable progress of ADV 110 during operation because once vehicle ADV 110 is engulfed by a tree canopy, GPS geolocating becomes the primary method for moving a vehicle along a desired path. Due to the possibility of faulty GPS signals, and resultant errant movement, video can be used to check that vehicle ADV 110 is driving down the center of a row, and not offset to one side.

Figure 12:
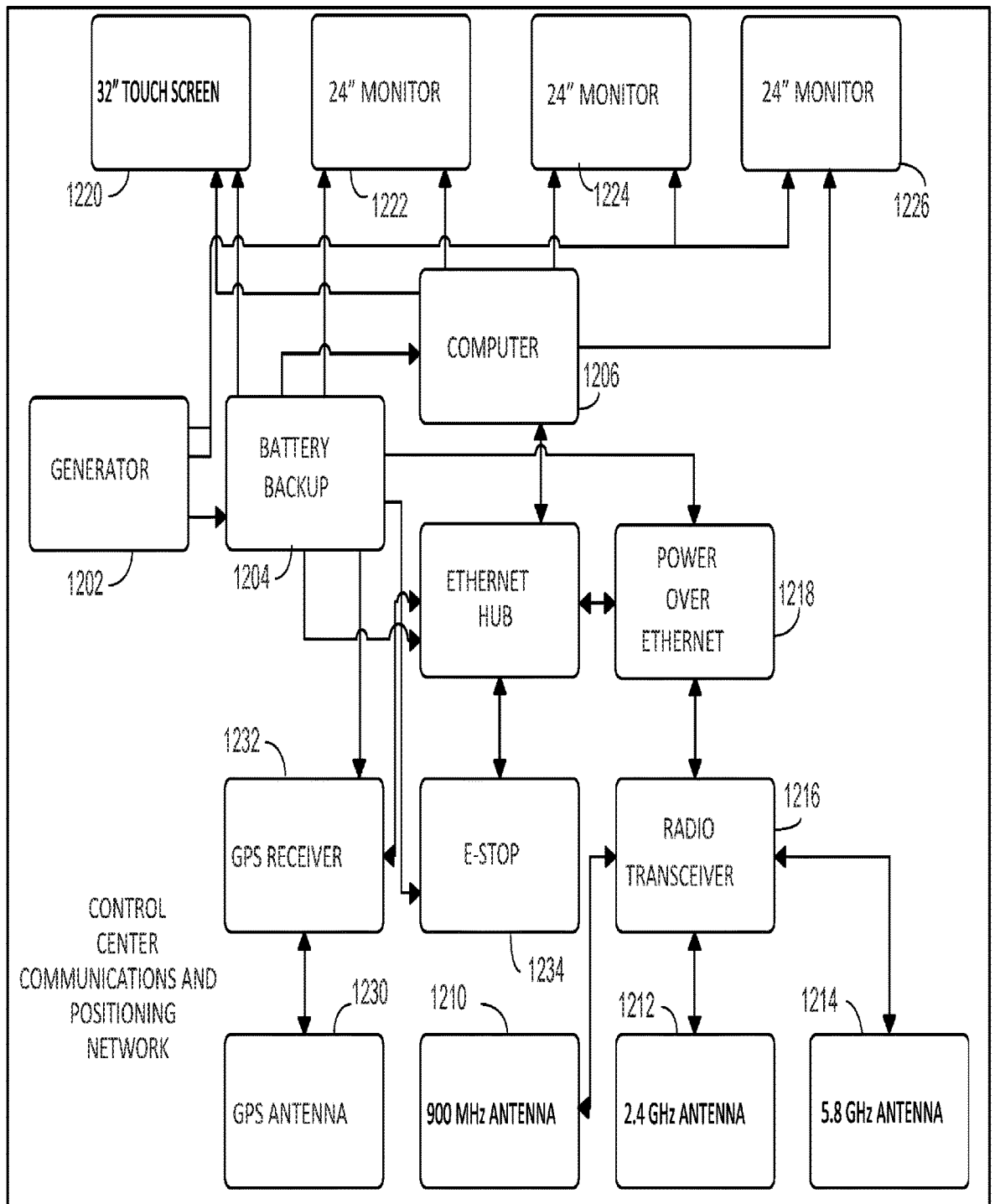

FIG. 12 illustrates an embodiment of communication and positioning system 1200 of mobile control center 1000. System is powered by generator 1202, which can be similar to 7 kW generator 1004. Generator 1202 can supply backup battery 1204, which is depicted as battery 1112 in FIG. 11. Generator 1202 and battery 1204 can serve as the power platform for computer 1206, which receives and processes information received from Ethernet hub 1208. In turn, Ethernet hub 1208 bidirectionally communicates with each of computer 1206, Power over Ethernet 1218 (which communicates radio signals), GPS receiver 1232, and E-Stop 1234. Power over Ethernet 1218 provides power to radio transceiver 1216, which communicates signals over at least one of 900 MHz antenna 1210, 2.4 GHz antenna 1212, or 5.8 GHz antenna 1214. These signals may be communicated among ADV 110, mapper vehicle 130, nurse truck 140, or handheld radios in the field. Similarly, GPS antenna 1230 receives real-time GIS signals relative to the position of mobile control center 1000. These GPS signals are communicated by GPS receiver, in Ethernet format, to Ethernet hub 1218. Computer 1206 can communicate with touch-screen input and display monitor 1220, which is similar to display 1102 to send commands and receive data from the entire system. Monitor 1222, which can be like monitor 1104a, is mounted proximate to monitor 1220. Monitor 1222 can be configured to display real-time video signals from ADV 110, so that the control operator can be aware of the location of ADV 110 while it is operating. Monitor 1224 and monitor 1226 can be used to display information relating to ADV 110, mapper vehicle 130 or nurse truck 140, as well as mobile control center 120.

Figure 13:
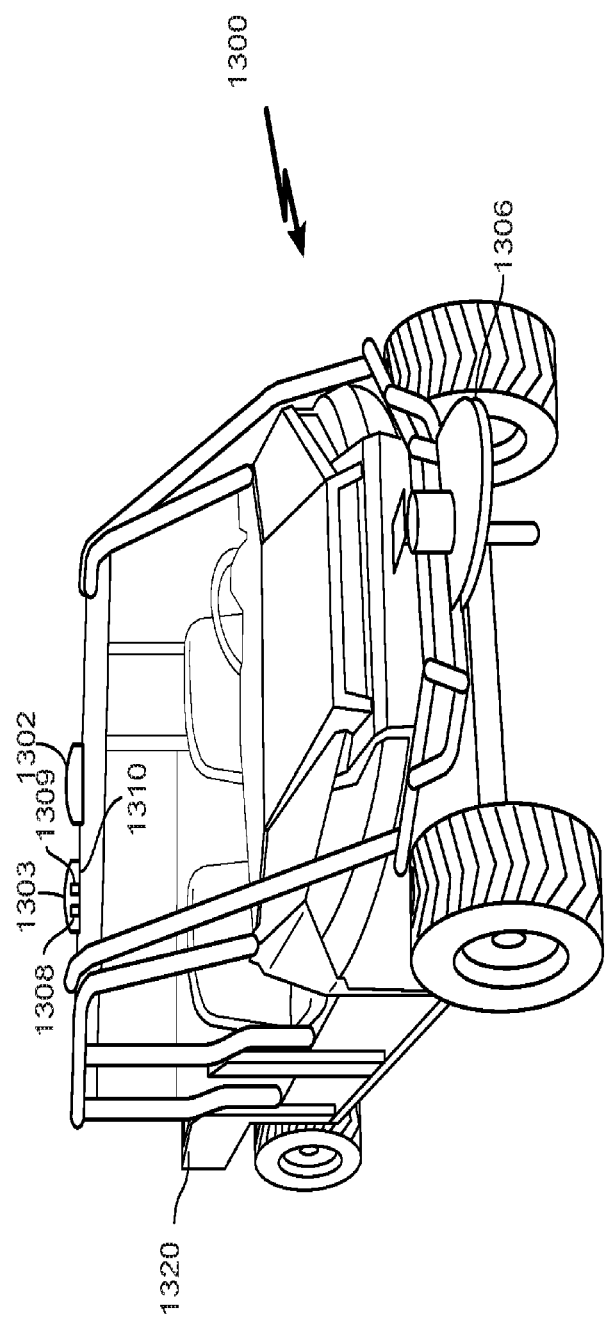

FIG. 13 is an illustration of mapper vehicle 1300, which is physically and functionally similar to mapper vehicle 130. Mapper vehicle 1300 is used to identify, select, and create maps of predefined paths in predefined regions, for example, of an orchard. Mapper vehicle 1300 can be an all-terrain vehicle (ATV) to easily navigate the often dense and torturous orchard inter-tree pathways. Mapper vehicle 1300 can include fore GPS receiver 1302 and aft GPS receiver 1303, which can be RTK-DGPS receivers, to obtain the most accurate positional information available. However, because orchard tree canopies can be extremely dense, creating multipath and attenuating incoming satellite signals, mapper vehicle 1300 can employ LiDAR sensor 1306. LiDAR sensor 1306 provides an accurate tree trunk placement of trees in a selected portion of orchard and an accurate path descriptions relative to the actual positions of tree trunks. This information can assist ADV 110 in identifying, selecting, verifying, and following a predefined path. GPS and LiDAR information sensed by mapper vehicle 1300 can be transmitted to mobile control center 1000 by mapper vehicle 1300 radio, which is coupled to 900 MHz antenna, 2.4 GHz antenna, and 5.8 GHz antenna, respectively. Mapper vehicle 1300 also can be a support vehicle for field operations, which carries diesel fuel, hydraulic oil, motor oil (tanks at 1320) and basic tools and parts (not shown) to facilitate repairs in the field. Mapper vehicle 1300 includes a tablet-type computer with software to watch spraying operation in progress. Planar laser 1306 can be a model VLP-16 3D LiDAR sensor from Velodyne LiDAR, Morgan Hill, CA USA. Alternatively, a model LMS-151 from Sick AG, Waldkirch im Breisgau, DE may be used. A non-limiting example of mapper vehicle 1300 may be a Polaris® Ranger Crew Diesel 4×4 all-terrain vehicle, using a Kohler 1028 cc, 3 cylinder, 24 HP engine. Also, a laptop may be used with mapper vehicle 1300 to aid in real-time mapping and to reduce the amount of post-processing performed to create a map. The laptop may have specifications similar to mobile control center computer 1110.

Figure 14:
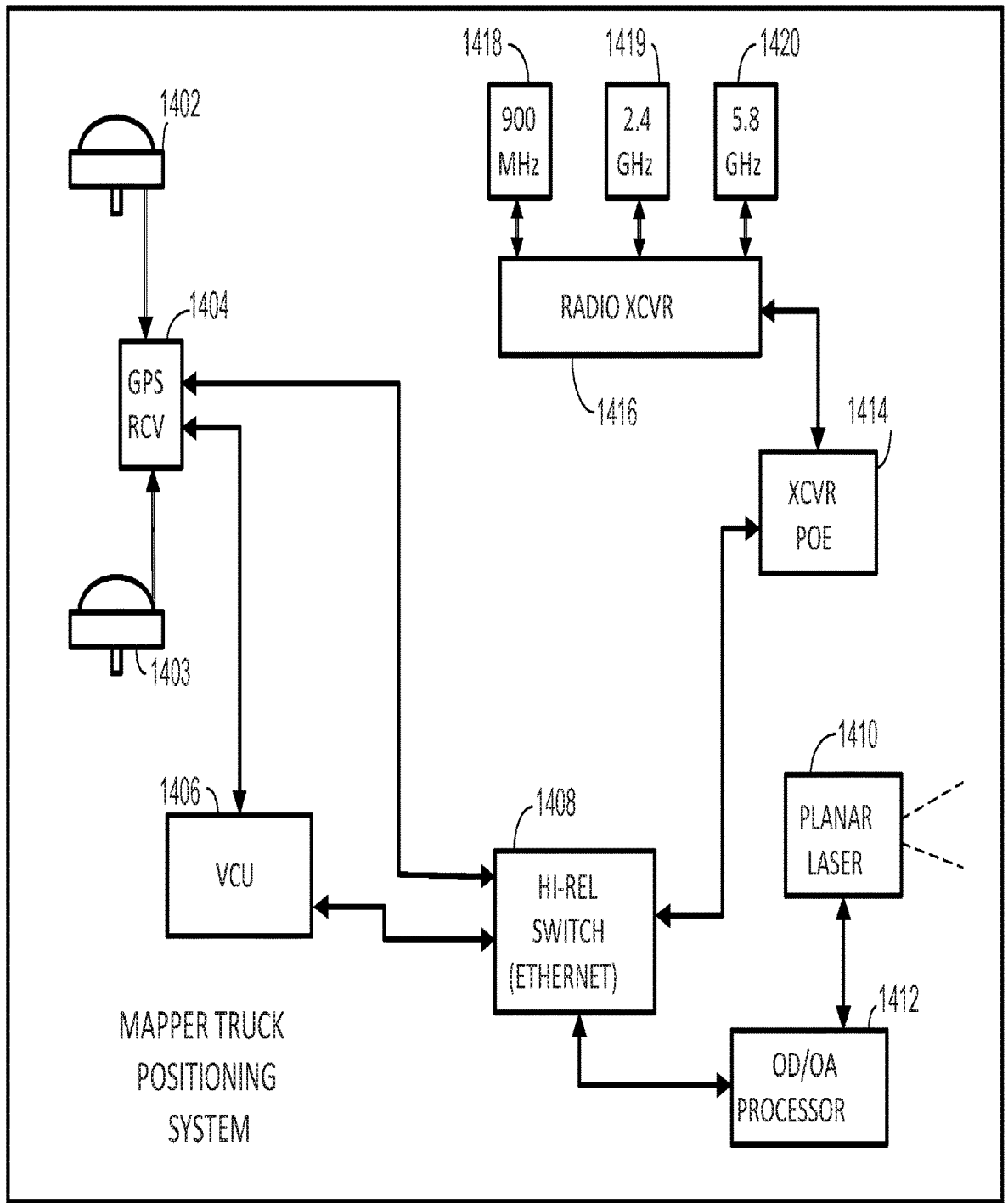
Figure 15:
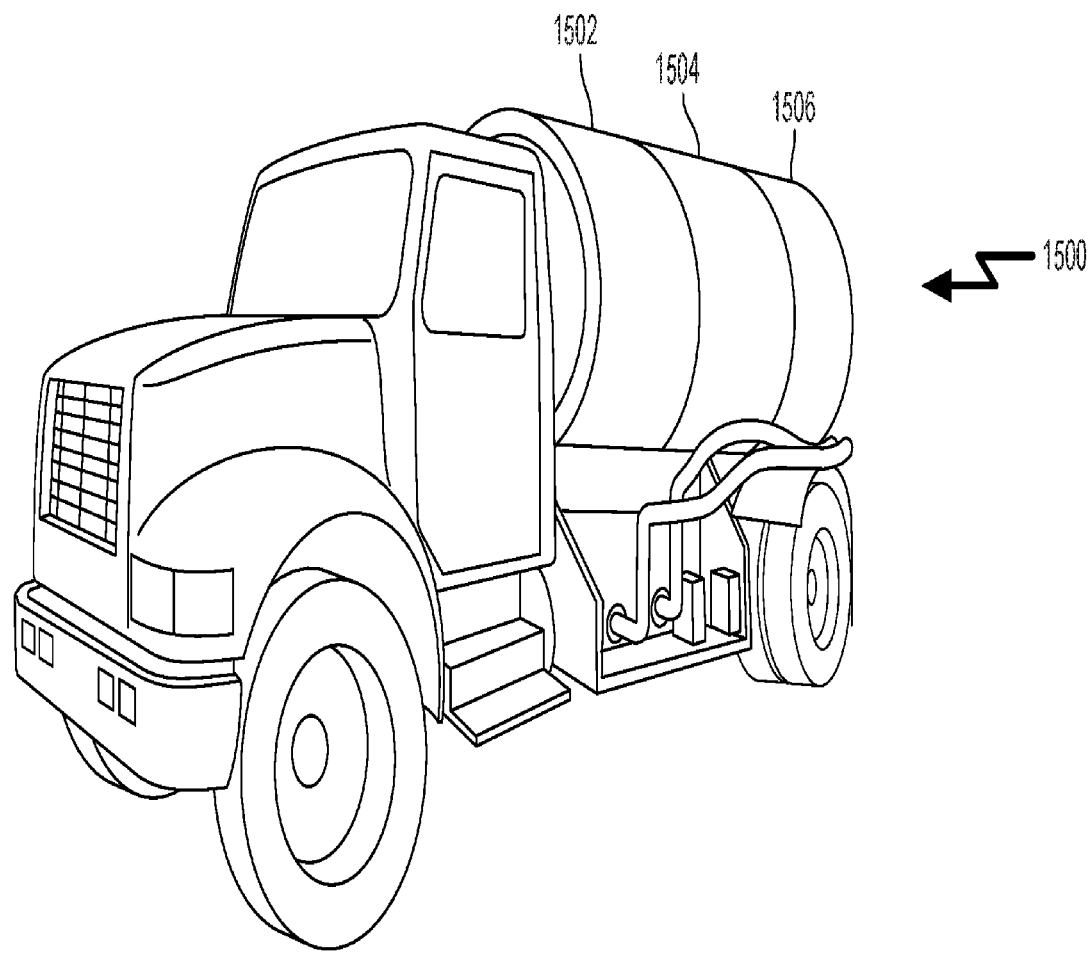

FIG. 14 is an illustration of an embodiment of mapper vehicle positioning system 1400, which can be used in mapper vehicle 1300. Mapper vehicle positioning system 1400 communicates with mobile control center 120, to provide orchard mapping and path data. System 1400 can be configured for use with a mapper vehicle such as mapper vehicle 130, or mapper vehicle 1300. System 1400 can include fore GPS antenna 1402, and aft GPS antenna 1403 for detecting GPS signals by GPS receiver 1404. GPS signals may be received by VCU 1406 in a manner similar to VCU 518, if available in system 1400. VCU 1406 may generate GPS-related commands that might be used in the movement of ADV 110. Planar laser 1410 generates LiDAR signal 1411, which provides a scanned image, representative of a predefined path in a predefined area of a field. LiDAR signal 1411 can be processed in OD/OA processor, if available, which can be like OD/OA processor 512. HI-REL Ethernet switch 1408, if necessary, can bidirectionally communicate signals with GPS receiver 1404, and if available, VCU 1406 and OD/OA processor 1412. HI-REL switch 1408 can bidirectionally communicate received signals with transceiver Power over Ethernet switch 1414, and then with radio transceiver 1416, which communicates the signals over one of several frequencies, as represented by 900 MHz antenna 1418, 2.4 GHz antenna 1419, or 5.8 GHz antenna 1420. Using radio transceiver 1416, mapper vehicle radio can serve as secondary repeater station for greater radio coverage in the field. As above, POE transceiver packet switch 522 can be a model VHDC-24V-50 W from Rajant Corp., Malvern, PA USA. Radio transceiver 524 can be a model LX-4 from Rajant Corp., Malvern, PA USA. 900 MHz antenna 526 can be a Model 08-ANT-0922 from MP Antennas, LTD, Elyria, OH USA. 2.4 GHz antenna 527 can be a Model TRAB24003P and 5.8 GHz antenna 528 can be a Model TRAB58003P, both from Laird USA, Earth City, MO USA. GPS antennas 502, 503 can be Zephyr 2 (ruggedized) antennas and GPS transceiver 504 can be Model BX982, all from Trimble Navigation Limited, Sunnyvale, CA USA FIG. 15 illustrates an embodiment of nurse truck 1500, which also can be configured with a radio repeater thereon, to assist mobile control center 120 with field communications. Nurse truck 1500 can be physically and functionally similar to nurse truck 140. Nurse truck 1500 can be used to mix preselected material at the pump to provide a pre-mixed solution. Nurse truck 1500 can be used to fill/refill ADV 110 during operations in the field. Accordingly, nurse truck 1500 can have three tanks: one tank for fuel 1502, one tank for pre-mixed solution 1504, and one tank for hydraulic fluid 1506. The total capacity for this embodiment of nurse truck 1500 can be about 2400 gallons. Of course, other tankers with different capacities and tank arrangements can be used. Nurse truck 1500 typically is deployed in a predetermined nurse truck region, an "apron," which may be close to the areas being sprayed by ADV 110. When ADV 110 senses that it is low on fuel, hydraulic solution, or pre-mixed solution, ADV 110 sends a signal to control vehicle 120, which sends a signal (text, voice, or digital data) to nurse truck 1500 to go to the aid of the ADV 110. Alternately, ADV 110 can move itself in proximity to the apron. Nurse truck 1500 also contains tools and spare parts (not shown) to facilitate field repairs. Nurse truck 1500 also can have a radio repeater communications network (FIG. 16) to further facilitate radio coverage within a field of operations.

Figure 16:
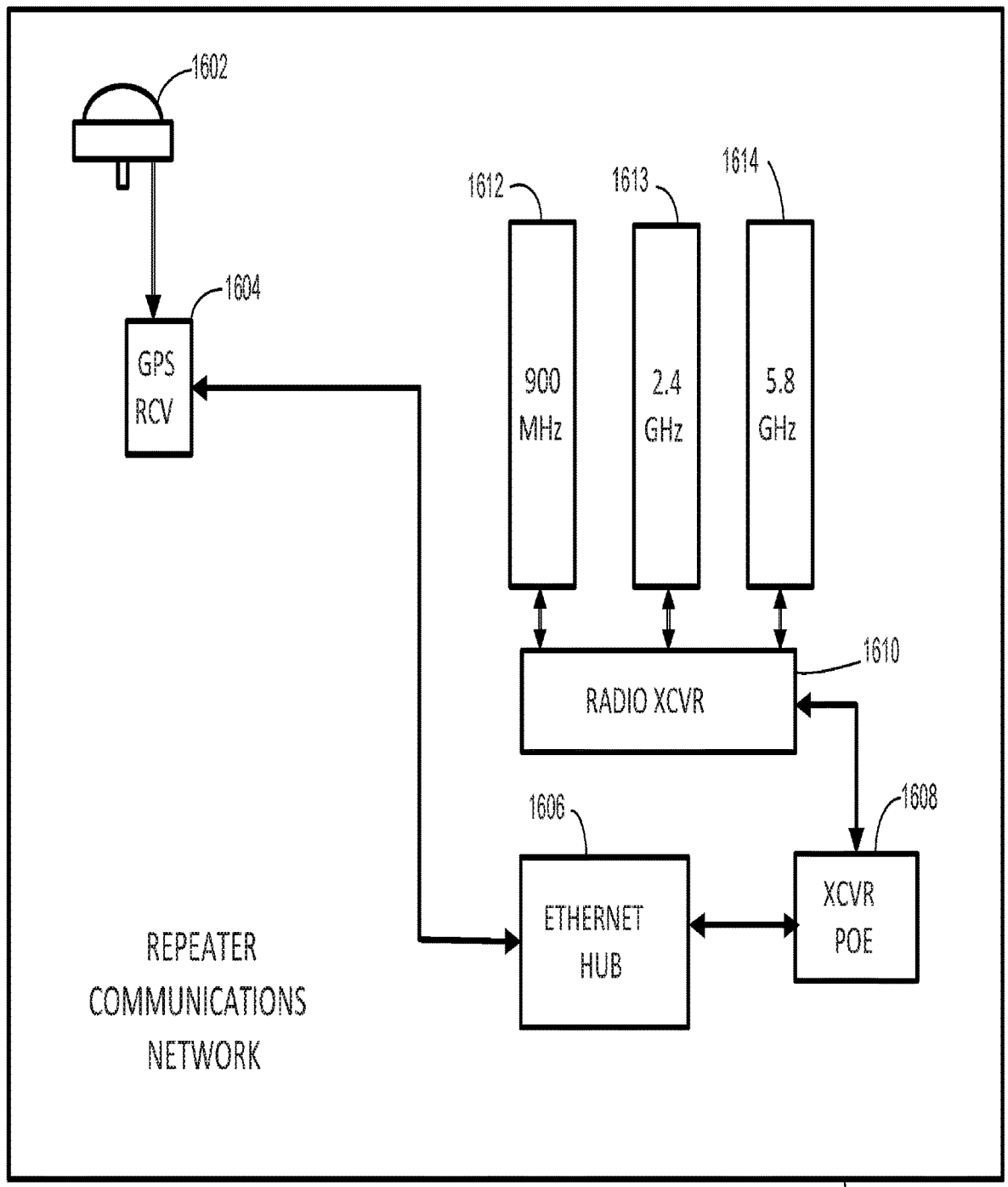

FIG. 16 illustrates an embodiment of radio repeater communications network 1600, as may be used by nurse truck 140 to enhance radio coverage between mobile control center 120, and other vehicles in system 100, as well as personnel with handheld radios, within a field of operations. Radio repeater communications network 1600 can have a GPS antenna 1602 and GPS receiver 1604, which provide mobile control center 120 with its location in the field. Receiver 1604 transmits the GPS signal to Ethernet hub 1606, which delivers the positional information to transceiver POE 1608. Transceiver 1610 receives the positional information signal from POE 1608, typically in Ethernet format. The positional information signal is then transmitted to mobile control center 120 using one of plural frequency bands over corresponding radio antenna of 900 MHz 1612, 2.4 GHz 1614, or 5.8 GHz 1618. Of course, if one or more other frequencies were used within system 100, radio repeater communications network 1600 would employ a transceiver and corresponding antenna capable of the other frequencies. As above, POE transceiver packet switch 522 can be a model VHDC-24V-50 W from Rajant Corp., Malvern, PA USA. Radio transceiver 524 can be a model LX-4 from Rajant Corp., Malvern, PA USA. 900 MHz antenna 526 can be a Model 08-ANT-0922 from MP Antennas, LTD, Elyria, OH USA. 2.4 GHz antenna 527 can be a Model TRAB24003P and 5.8 GHz antenna 528 can be a Model TRAB58003P, both from Laird USA, Earth City, MO USA. GPS antennas 502 can be Zephyr 2 (ruggedized) antenna and GPS transceiver 504 can be Model BX982, all from Trimble Navigation Limited, Sunnyvale, CA USA.

Figure 17:
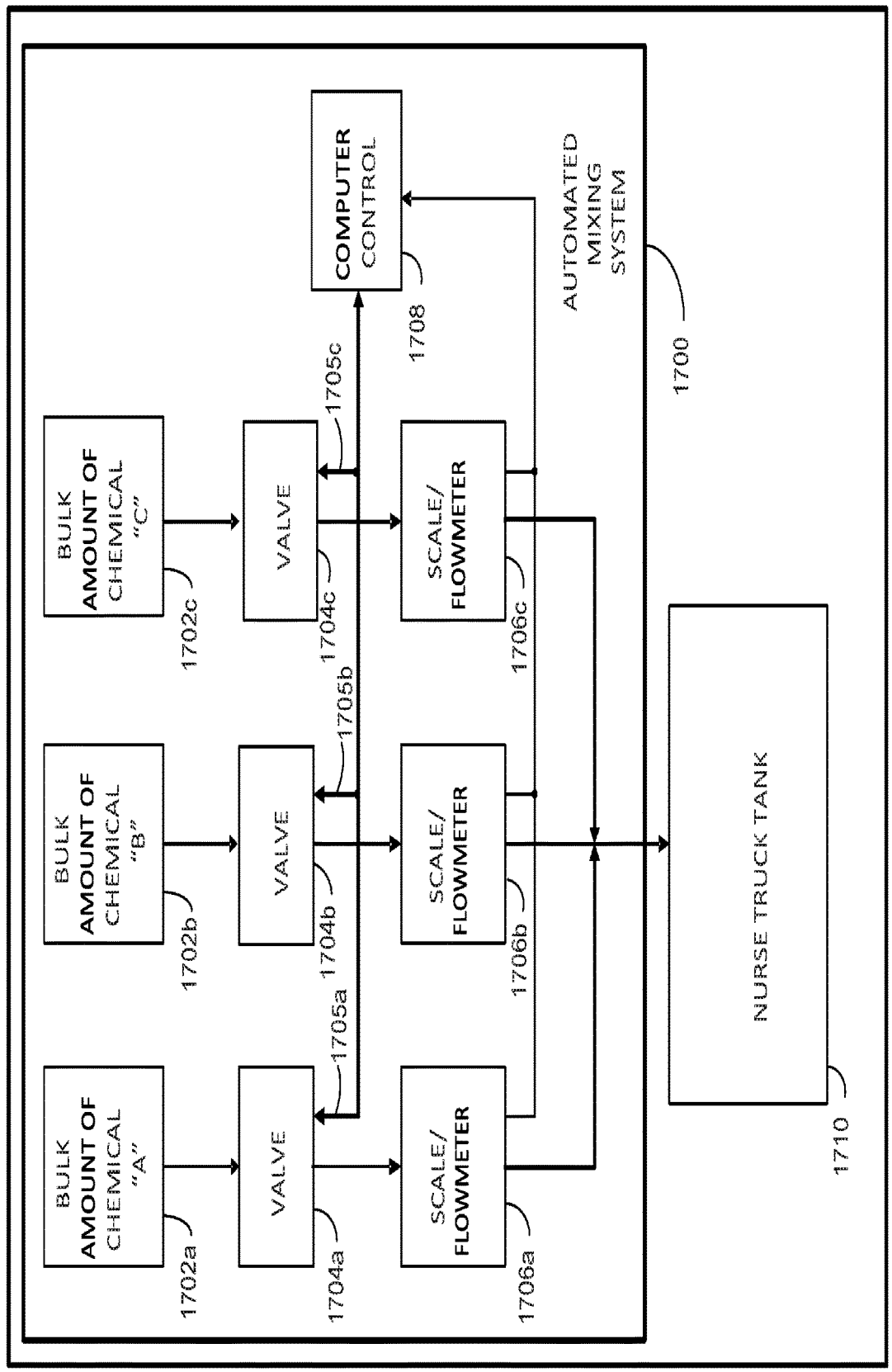

FIG. 17 illustrates an embodiment of an automated mixing system 1700, which may be used with nurse truck 140. System 1700 may be disposed upon and coupled to nurse truck 140, or may be separate. In addition, while system 1700 depicts a mixing system with three chemical inputs, mixing system 1700 could have more, or fewer, chemical inputs. Automated mixing system 1700 can include three chemical input tanks 1702*a-c*, the flow from which is controlled by variable-output valve 1704*a-c*. The output by each valve 1704*a-c* can be independently controlled by control inputs 1705*a-c*, respectively. Valves 1704*a-c* are respectively discharged into measuring devices 1706*a-c*, where the amount of fluid discharged can be measured. Measuring device 1706*a-c* could be a scale, or could be a continuous flowmeter. Measuring device 1706*a-c* provide a feedback signal to computer control 1708, wherein the amount of flow through valves 1704*a-c* can be determined and adjusted. Nurse truck tank 1710, which may be like tank 1504 in FIG. 15, can receive the independently measured solutions to provide a pre-mixed solution that will be administered by ADV 110.

Figure 18:
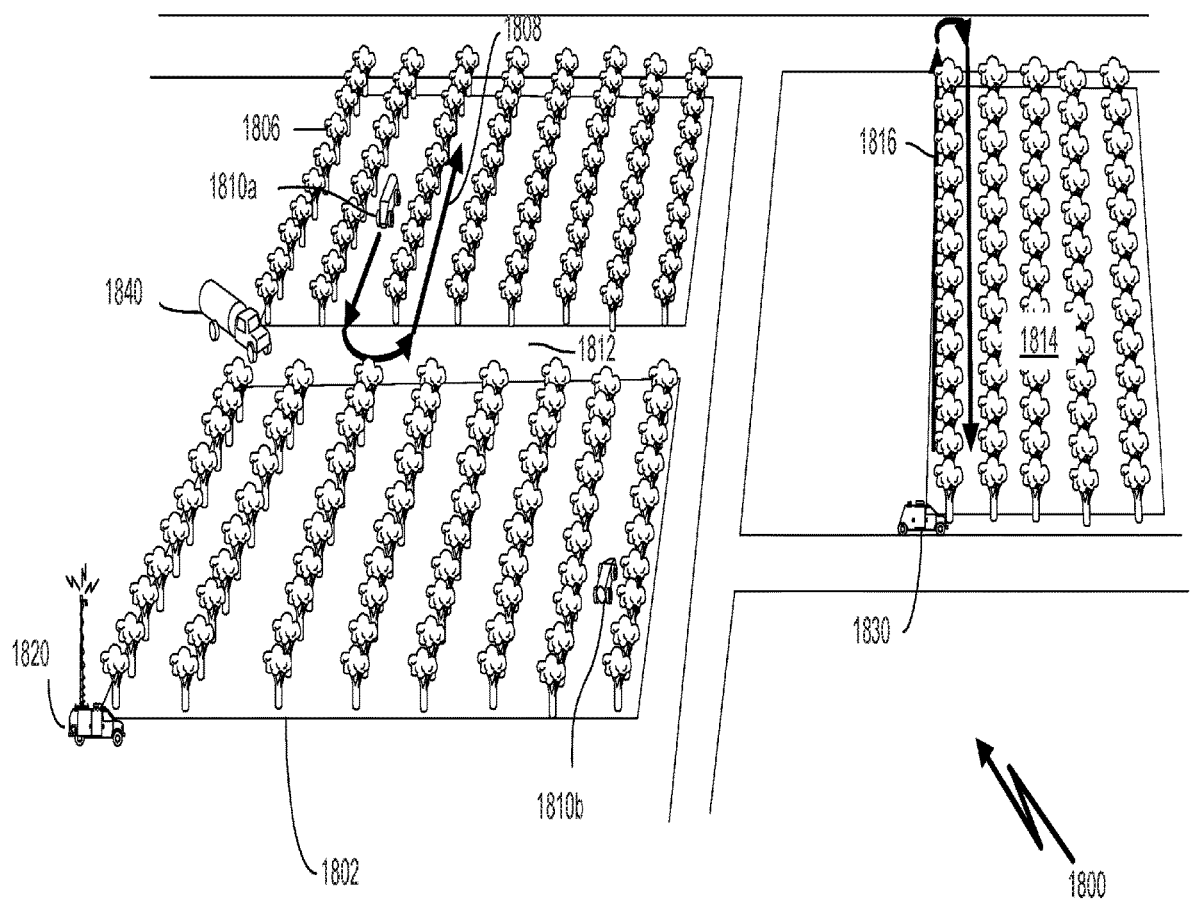

FIG. 18 illustrates an orchard milieu in which system 1800 is operating. System 1800 can be functionally and physically similar to system 100. That is, ADV 1810*a*, 1810*b* can be like ADV 110; mobile control center 1820 can be like mobile control center 120; mapper vehicle 1830 can be like mapper vehicle 130; and nurse truck 1840 can be like nurse truck 140. Nurse truck 1840 is included in system 1800 for spraying tasks, but may be dispensed with for other agricultural tasks. Mobile control center 1820 can collect survey information of the orchard from mapper vehicle 1830, and can generate respective predefined non-overlapping area and respective predefined non-overlapping path(s) for each ADV. Thus, ADV 1810*a* can be programmed to follow a respective predefined non-overlapping path 1808 in a respective predefined non-overlapping area 1806, for example, of tree orchard 1802. ADV 1810*a* can use LiDAR to verify its path and GPS to verify its area. Respective predefined non-overlapping path 1808 may be a serpentine forward path that meanders through respective predefined non-overlapping area 1806. As ADV 1810*a* follows a straightaway of the serpentine forward path, it reaches a switchback, during which ADV 1810*a* performs a turn. Typically, during a turn, spraying may be temporarily discontinued and resumed when the turn is completed, or nearly completed. Similarly, ADV 1810*b* can follow a corresponding respective predefined non-overlapping path(s) in a corresponding respective predefined non-overlapping area. To enhance efficiency, the area assigned to ADV 1810*a* and the paths assigned to ADV 1810*a*, as identified by the mapper vehicle 1830, and as formed by the command and control software in mobile control center 1820, do not overlap the area assigned to ADV 1810*b* and the paths assigned to ADV 1810*b*. GPS and LiDAR respectively verify that a particular respective predefined non-overlapping area and a particular respective predefined non-overlapping area are being followed by a respective ADV. Using system 1800, multiple ADVs 1810*x* may be deployed in a large orchard to autonomously apply at least one pre-mixed solution to trees within the orchard. An ADV may use LiDAR or a video feed to mobile control center 1820 to verify its path and positioning along the path. Clearly, system 1800 may be used in one or more orchards or portions of orchards.

Both ADV 1810*a* and ADV 1810*b* can be monitored and controlled by mobile control center 1820. While ADV 1810*a,b* are spraying a premixed solution onto orchard 1802, nurse truck 1840 waits on apron 1812, for a need as indicated by ADV 1810*a,b* and as determined in mobile control center 1820. Mobile control center 1820 can monitor ADV 1810*a,b* and can send a command to nurse truck 1840 to meet ADV 1810*a*, for example, at a designated portion of apron 1812, so that addition of pre-mixed solution, fuel, or hydraulic fluid can be replenished as needed in ADV 1810*a*. It can be less troublesome for ADV 1810 to meet nurse truck 1840 on apron 1812 than to have nurse truck 1840 move between the trees of orchard 1802.

Mapper vehicle 1830 can be disposed in an unmapped area 1814 of orchard 1802. Mapper vehicle 1830 can move up and down the rows of area 1814, using GPS and LiDAR, to determine and identify a forthcoming predefined path 1816 in a new predefined area 1814. As mapper vehicle moves about area 1814, it transmits the corresponding GPS and LiDAR information about area 1814 to mobile control center 1820, until mapping of area 1814, or a portion thereof, is completed.

Figure 19A:
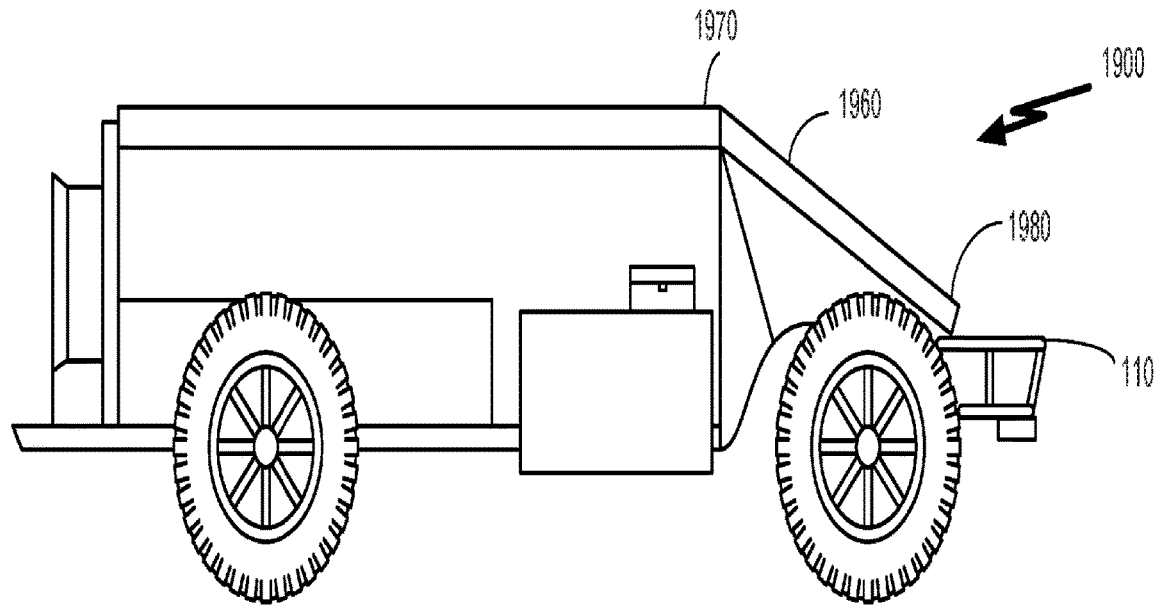
Figure 19B:
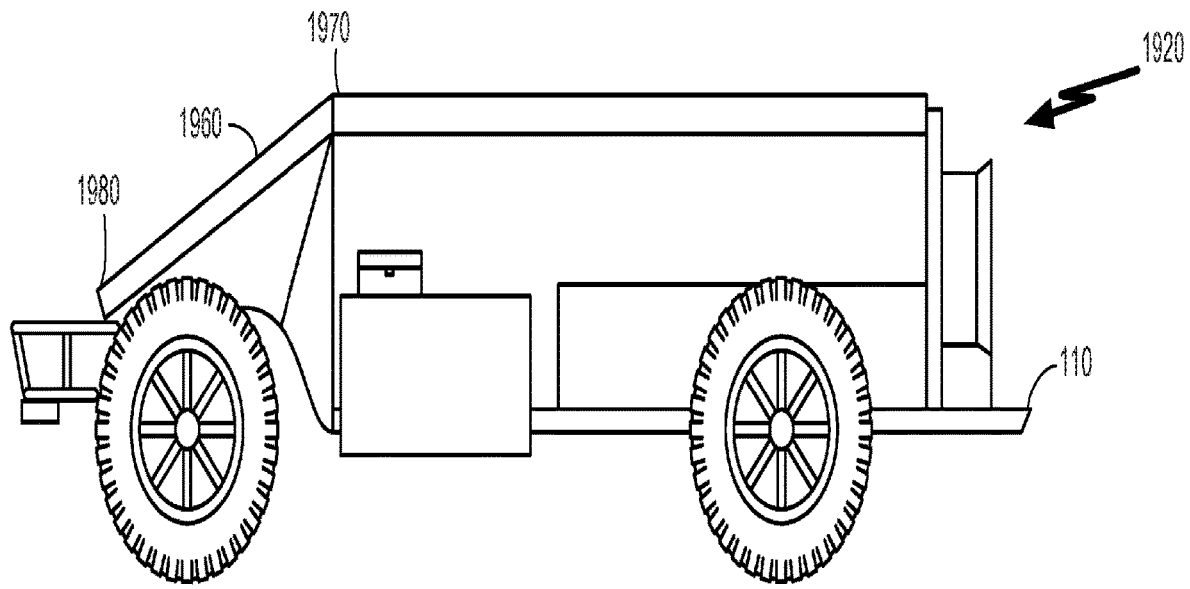
Figure 19C:
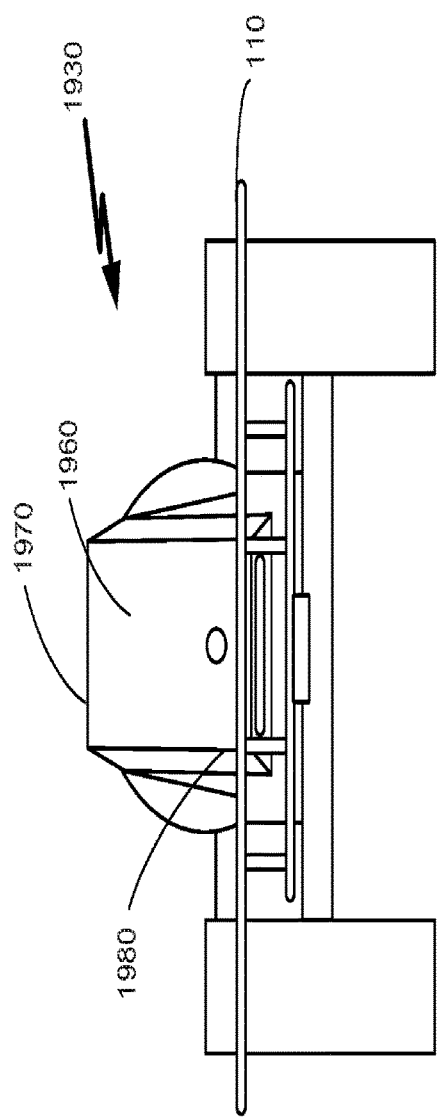
Figure 19D:
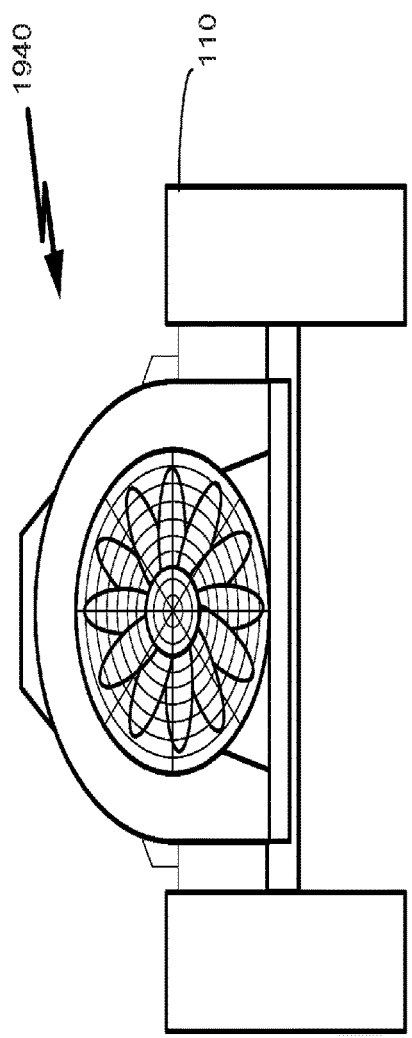
Figure 19E:
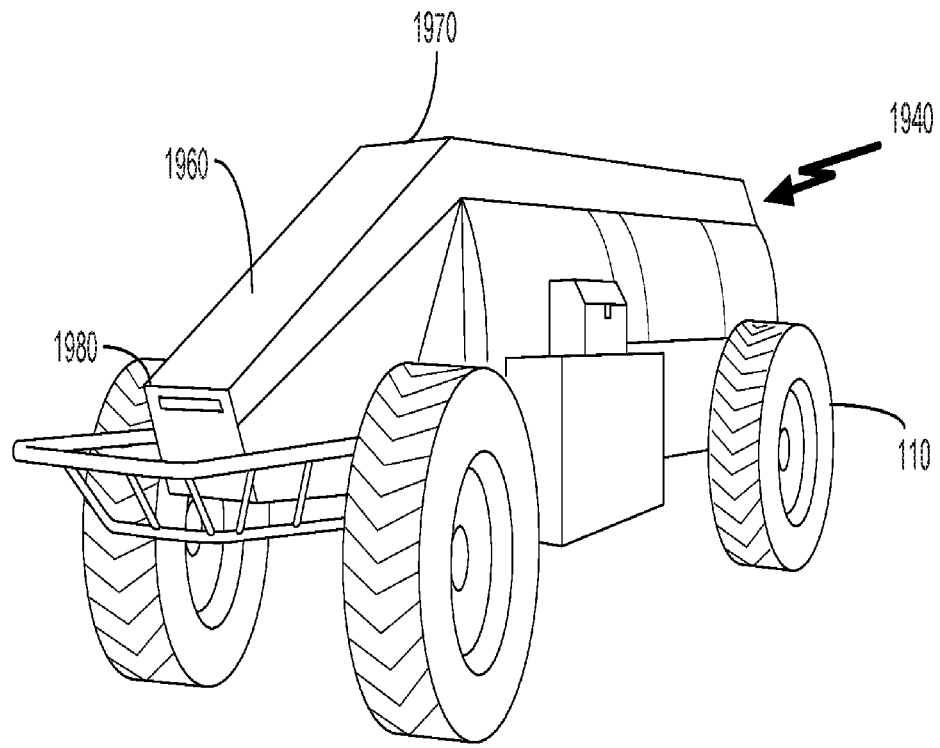
Figure 19F:
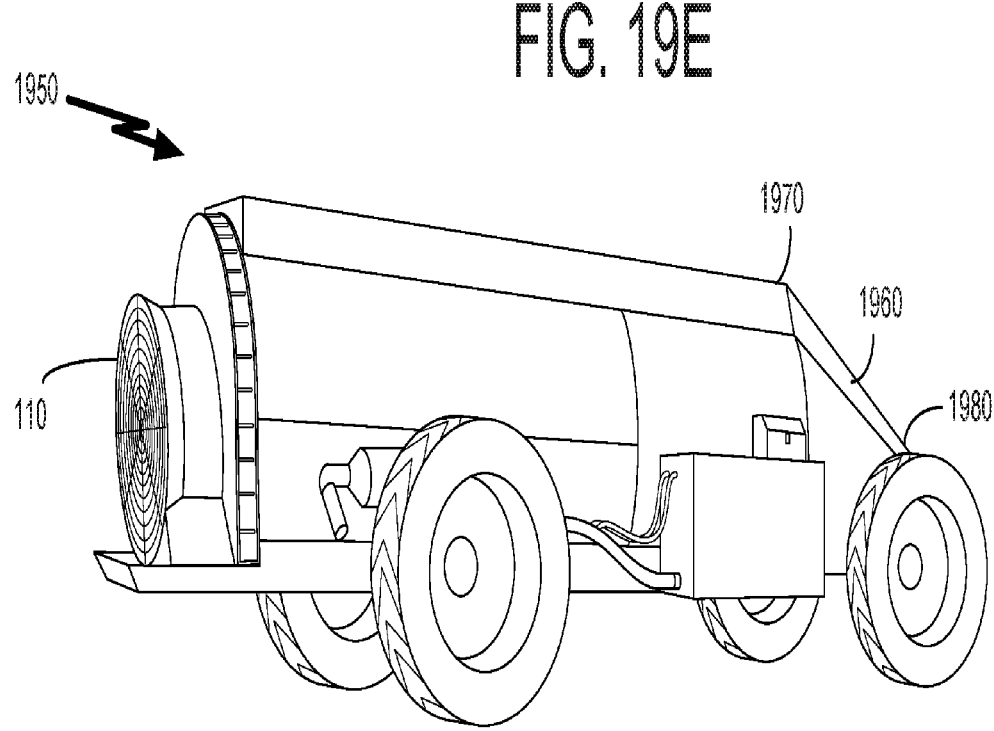

FIG. 19A-F illustrate the physical configuration of a typical ADV 110. In FIG. 19A, right broadside profile 1900 (front, right) of ADV 110 is shown; in FIG. 19B, the left broadside profile 1910 (front, left) of ADV 110 is shown. In FIG. 19C, ADV 110 is illustrated as front head-on profile 1920; in FIG. 19D, ADV 110 is illustrated by the direct-on rear profile 1930. In FIG. 19E, ADV 110 is illustrated by the left front perspective profile 1940; in FIG. 19F ADV 110 is illustrated by the right rear perspective profile 1950. In general, ADV 110 can be about 102" wide, about 276" long, and about 67" tall. Typically, a portion of the body is approximately cylindrical. In profiles 1900, 1910, 1930, 1940, and 1950, the front portion 1960 is shown to be distinctively up-sloped from the front end 1980 of the vehicle chassis towards the top of the cylindrical body 1970. This feature is intended to deflect dense vegetation canopies, as may be seen in a commercial tree orchard, thereby easing the forward progress of ADV 110, particularly in very dense vegetation canopies, e.g., an almond tree orchard, a vineyard, or open field of row crops. Further, the elongated vehicle body provides a vehicle configuration which maximizes the space available for fluid tanks and operating equipment, while maintaining a sleek profile with an up-sloped front that facilitates the passage of ADV 110 through the vegetation canopy. The aft implement actuator and implement may be modified to include any agricultural field task, including, without limitation, spraying, fertilizing, disking, plowing, tilling, or spreading.

A modified version of ADV 110 suitable for a vineyard can be about 84" wide and 225" long, have a similar profile and use a 4-cylinder turbocharged diesel engine. It also can have a 600 gallon stainless steel premixed solution tank, a 60-gallon diesel fuel tank, and a 60 gallon hydraulic fuel tank. As with full-scale ADV 110, the engine propels a hydraulic pump, which drives the wheels 202*a-d*. The rear dispersal fan 230 housing and delivery duct 232 of modified ADV 110 can be configured to completely spray two adjacent rows of vines, allowing every-other-row movement through the predefined area of the vineyard, increasing efficiency. Other embodiments of ADV 110 may be manufactured to meet the row width of nearly any cultured crop. Other structures, controls, and functions can be similar to a full-scale ADV 110, which may be used for tree orchards or open field crop applications, including annual or perennial crops.

Method embodiments can be derived from the foregoing including, without limitation, autonomously determining the forward path with a forward-looking sensor; autonomously following the forward path; and while following the forward path, autonomously performing a predetermined agricultural task on the forward path. The forward path can be the forward path adjacent to a row or rows of trees or vines or crops. Following the forward path can be following the forward path between an adjacent row or rows of trees or vines or row crops. Determining the forward path can include determining an area containing the forward path using a GPS sensor. The method can include employing an autonomous delivery vehicle for performing a predetermined agricultural vehicle, and communicating a location of the forward path of the autonomous delivery vehicle to a mobile control center. Determining the forward path with a forward-looking sensor can be performed by a mapper vehicle. Further, the method can include downloading a pre-identified forward path, comparing the current forward path to the downloaded forward path, and autonomously correcting a heading corresponding to the downloaded forward path, using the forward-looking sensor and the GPS sensor. The method can further include downloading a predefined serpentine forward path having turns within a predefined area, autonomously moving along the predefined serpentine forward path, and autonomously performing a predetermined agricultural task except during a turn, wherein the predefined serpentine forward path is identified by a forward-looking LiDAR sensor, and the predefined area is identified by a GPS sensor.

The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings, although not every figure may repeat each and Every feature that has been shown in another figure in order to not obscure certain features or overwhelm the figure with repetitive indicia. It is understood that the invention is not limited to the specific methodology, devices, apparatuses, materials, applications, etc., described herein, as these may vary. It is also to be understood that the terminology used herein is used for the purpose of describing particular embodiments only, and is not intended to limit the scope of the invention.

The invention claimed is:

1. A command and control network for an agricultural robotic system, comprising:
   a cellular radio network coupling at least one autonomous delivery vehicle to a mobile control center, at least one mapper, and at least one nurse truck;
   wherein the at least one autonomous delivery vehicle is configured to receive actionable information from the mobile control center and from the at least one mapper; and
   wherein the at least one autonomous delivery vehicle is configured to transmit actionable information to the mobile control center and to the nurse truck.

2. The command and control network of claim 1, further comprising:
   a digital cellular radio network configured to provide inter-vehicle communication.

3. The command and control network of claim 2, wherein the digital cellular radio network further comprises: a radio repeater communications network.

4. The command and control network of claim 3, further comprising a video network coupling the at least one autonomous delivery vehicle to the mobile control center, wherein the radio repeater network is an Internet protocol network or the video network is an Internet protocol network.

5. The command and control network of claim 1, wherein the autonomous delivery vehicle is overseen and controlled by the mobile control center.

6. The command and control network of claim 1, wherein the autonomous delivery vehicle is directed in a predefined path stipulated by the mobile control center.

7. The command and control network of claim 1, wherein the mapper vehicle transmits by radio at least one of GPS and LiDAR data corresponding to a path to the mobile control center.

8. The command and control network of claim 1, wherein the cellular radio network couples the at least one autonomous delivery vehicle to the nurse truck.

9. The command and control network of claim 8, wherein the nurse truck utilizes a radio repeater to send control signals to and monitor sensor signals from the autonomous delivery vehicle.

* * * * *